US012567387B2

(12) United States Patent
Chen et al.

(10) Patent No.: US 12,567,387 B2
(45) **Date of Patent: *Mar. 3, 2026**

(54) COMPENSATION CIRCUIT AND DISPLAY DEVICE

(71) Applicant: HKC CORPORATION LIMITED, Guangdong (CN)

(72) Inventors: Qiang Chen, Guangdong (CN); Junfeng Xie, Guangdong (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/816,427

(22) Filed: Aug. 27, 2024

(65) Prior Publication Data

US 2025/0124886 A1 Apr. 17, 2025

(30) Foreign Application Priority Data

Oct. 12, 2023 (CN) ......................... 202311317181.6

(51) Int. Cl.
*G09G 3/36* (2006.01)
*G09G 3/00* (2006.01)
*G09G 3/20* (2006.01)

(52) U.S. Cl.
CPC ........... *G09G 3/3614* (2013.01); *G09G 3/006* (2013.01); *G09G 3/2092* (2013.01);
(Continued)

(58) Field of Classification Search
CPC .... G09G 3/3614; G09G 3/006; G09G 3/2092; G09G 2310/0291; G09G 2330/021; G09G 2330/12
See application file for complete search history.

(56) References Cited

U.S. PATENT DOCUMENTS 8,711,135 B2 * 4/2014 Lin ...................... G09G 3/3655 345/87
9,330,624 B1 * 5/2016 Pei ........................ H03F 3/2173
(Continued)

FOREIGN PATENT DOCUMENTS

CN 101556785 A * 10/2009
CN 104658500 A * 5/2015
(Continued)

*Primary Examiner* — Ke Xiao
*Assistant Examiner* — Jennifer L Zubajlo

(57) ABSTRACT

A compensation circuit, including: a power management circuit and a switch circuit. The switch circuit is connected to a display panel and an operational amplifier circuit connected to the display panel. In case that a feedback voltage is greater than or equal to a target threshold, the switch circuit outputs a common voltage and an operating voltage to the operational amplifier circuit and stops outputting the common voltage to the display panel; and the operational amplifier circuit receives the common voltage and the operating voltage and outputs a compensation voltage to the display panel. In case that the feedback voltage is smaller than the target threshold, the switch circuit outputs the common voltage to the display panel and stops outputting the common voltage and the operating voltage to the operational amplifier circuit; and the operational amplifier circuit stops receiving the feedback voltage and stops outputting the compensation voltage.

16 Claims, 10 Drawing Sheets

(52) U.S. Cl.
CPC ............... *G09G 2310/0291* (2013.01); *G09G 2330/021* (2013.01); *G09G 2330/12* (2013.01)

(56) References Cited

U.S. PATENT DOCUMENTS

| | | | | | |
|---|---|---|---|---|---|
| 11,138,946 | B2 * | 10/2021 | Wang | G09G 3/3611 | |
| 12,451,098 | B2 * | 10/2025 | Chen | G09G 3/36 | |
| 2006/0071896 | A1 * | 4/2006 | Nakata | G09G 3/20 | 345/94 |
| 2016/0372025 | A1 * | 12/2016 | Ahn | G09G 3/3655 | |
| 2020/0251063 | A1 * | 8/2020 | Liu | G09G 3/36 | |
| 2020/0389135 | A1 * | 12/2020 | Putzeys | H03F 3/2171 | |
| 2021/0125573 | A1 * | 4/2021 | Wang | G09G 5/393 | |
| 2025/0124886 | A1 * | 4/2025 | Chen | G09G 3/3655 | |
| 2025/0124891 | A1 * | 4/2025 | Chen | G09G 3/36 | |

FOREIGN PATENT DOCUMENTS

| | | | | | |
|---|---|---|---|---|---|
| CN | 107799082 | A | * | 3/2018 | G09G 3/3696 |
| KR | 20110063980 | A | | 6/2011 | |
| KR | 20130052399 | A | * | 5/2013 | G09G 3/3696 |

* cited by examiner

COMPENSATION CIRCUIT AND DISPLAY DEVICE

CROSS-REFERENCE TO RELATED APPLICATION

Pursuant to 35 U.S.C. § 119 and the Paris Convention, this application claims the benefit of Chinese Patent Application No. 202311317181.6 filed on Oct. 12, 2023, the content of which is incorporated herein by reference.

TECHNICAL FIELD

The present application relates to the field of display technology, and in particular, to a compensation circuit and a display device.

BACKGROUND

The statements provided herein are merely background information related to the present application, and do not necessarily constitute any prior arts. With the development of liquid crystal display technology, the display effect of display panels is becoming more and more important. To achieve better display effects, commonly-used technologies include: a common-voltage compensation method, a polarity inversion method, etc.

The common-voltage compensation method and polarity inversion method need to rely on a compensation circuit to implement. The compensation circuit generally includes a timing controller, which can detect whether the display panel has a display problem and indicate the severity of the display problem. In the event of a less serious display problem, a low level of PDF (pattern defect function) signal is output from the timing controller, and at this time the display problem is improved by using the common-voltage compensation method. In the event of a more serious display problem, a high level of PDF signal is output from the timing controller, and at this time the display problem is improved by the polarity inversion method.

However, in existing technologies, when the display panel has a display problem of a relatively mild degree, the compensation circuit continues to be improved by the common-voltage compensation method, which results in a large power consumption of the compensation circuit. Thus, a new compensation circuit is urgently needed to solve the above problem.

SUMMARY

In view of this, embodiments of the present application provide a compensation circuit and a display device, aiming to reduce the power consumption when a display panel has a display problem of a relatively mild degree.

To achieve the above objective, in accordance with a first aspect of the embodiments of the present application, a compensation circuit is provided, which includes: a power management circuit, a switch circuit and an operational amplifier circuit. The power management circuit is connected to the switch circuit and configured to output a common voltage and an operating voltage to the switch circuit. The switch circuit is connected to the operational amplifier circuit. The operational amplifier circuit and the switch circuit are configured to be connected to a display panel, respectively. The switch circuit and the operational amplifier circuit are respectively configured to receive a feedback voltage output from the display panel. The switch circuit is configured, in case that the feedback voltage is greater than or equal to the target threshold, to output the common voltage and the operating voltage to the operational amplifier circuit and stop outputting the common voltage to the display panel; and the operational amplifier circuit is configured to receive the common voltage and the operating voltage output from the switch circuit, and output a compensation voltage to the display panel. The switch circuit is also configured, in case that the feedback voltage is smaller than the target threshold, to output the common voltage to the display panel and stop outputting the common voltage and the operating voltage to the operational amplifier circuit; and the operational amplifier circuit is also configured to stop receiving the feedback voltage output from the display panel and stop outputting the compensation voltage to the display panel.

As an optional implementation of the embodiments of the present application, the compensation circuit also includes a timing controller. The timing controller is connected to the display panel and the switch circuit respectively. The timing controller is configured to output a pattern defect function (PDF) signal to the display panel and the switch circuit. A priority of detecting the PDF signal by the switch circuit is higher than a priority of detecting the feedback voltage.

The switch circuit is also configured, when the display panel is controlled by the PDF signal to perform polarity inversion, to output a common voltage to the display panel and stop outputting the common voltage and the operating voltage to the operational amplifier circuit; and the operational amplifier circuit is configured to stop outputting the compensation voltage to the display panel and stop receiving the feedback voltage output from the display panel.

When the display panel is controlled by the PDF signal not to perform polarity inversion, the switch circuit is also configured, in case that the feedback voltage is greater than or equal to the target threshold, to output the common voltage and the operating voltage to the operational amplifier circuit and stop outputting the common voltage to the display panel; and the operational amplifier circuit is configured to receive the common voltage and the operating voltage output from the switch circuit, and output the compensation voltage to the display panel. The switch circuit is also configured, in case that the feedback voltage is smaller than the target threshold, to output the common voltage to the display panel and stop outputting the common voltage and the operating voltage to the operational amplifier circuit; and the operational amplifier circuit is also configured to stop receiving the feedback voltage output from the display panel and stop outputting the compensation voltage to the display panel.

As an optional implementation of the embodiments of the present application, the display panel is controlled by the PDF signal to perform polarity inversion includes that: the timing controller is configured to detect a display problem of the display panel, and output a high level of PDF signal to the display panel and the switch circuit when the display panel has a target display problem, to control the display panel to perform polarity inversion. The display panel is controlled by the PDF signal not to perform polarity inversion includes that: the timing controller is configured to detect the display problem of the display panel, and output a low level of PDF signal to the display panel and the switch circuit when the display panel has a non-target display problem, and the display panel does not perform polarity inversion. The display problem includes greenish or crosstalk of varying severity, and the target display problem is used to indicate the greenish or crosstalk of higher severity in the display problem.

As an optional implementation of the embodiments of the present application, the switch circuit includes a first switch, a second switch and a third switch. A control end of the first switch, a control end of the second switch and a control end of the third switch are in connection with a feedback voltage end of the display panel respectively. An input end of the first switch is in connection with a second output end of the power management circuit, and an output end of the first switch is connected to a power supply end of the operational amplifier circuit. An input end of the second switch is in connection with a first output end of the power management circuit, and an output end of the second switch is connected to a common voltage end of the display panel. An input end of the third switch is in connection with the first output end of the power management circuit, and an output end of the third switch is connected to a first input end of the operational amplifier circuit. A second input end of the operational amplifier circuit is in connection with the feedback voltage end of the display panel, and an output end of the operational amplifier is connected to a compensation voltage end of the display panel.

The switch circuit is configured, in case that the feedback voltage is greater than or equal to the target threshold, to output the common voltage and the operating voltage to the operational amplifier circuit and stop outputting the common voltage to the display panel, includes that: in case that the feedback voltage is greater than or equal to the target threshold, the first switch and the third switch are controlled to be switched on and the second switch is controlled to be switched off via the feedback voltage; the operating voltage via the first switch is output to the operational amplifier circuit, the common voltage via the third switch is output to the operational amplifier circuit, and the second switch stops outputting the common voltage to the display panel.

The switch circuit is also configured, in case that the feedback voltage is smaller than the target threshold, to output the common voltage to the display panel and stop outputting the common voltage and the operating voltage to the operational amplifier circuit, includes that: in case that the feedback voltage is smaller than the target threshold, the first switch and the third switch are controlled to be switched off and the second switch is controlled to be switched on via the feedback voltage; the common voltage via the second switch is output to the display panel, the first switch stops outputting the operating voltage to the operational amplifier circuit, and the third switch stops outputting the common voltage to the operational amplifier circuit.

As an optional implementation of the embodiments of the present application, the switch circuit includes a first switch and a first selector. A feedback voltage end of the display panel is respectively connected to a second input end of the operational amplifier circuit, a first voltage end of the first selector and a control end of the first switch. A second voltage end of the first selector is in connection with a third output end of the power management circuit, a third voltage end of the first selector is in connection with a first output end of the power management circuit, a first output end of the first selector is connected to a first input end of the operational amplifier circuit, and a second output end of the first selector is connected to a common voltage end of the display panel. An input end of the first switch is in connection with a second output end of the power management circuit, and an output end of the first switch is connected to a power supply end of the operational amplifier circuit. An output end of the operational amplifier circuit is connected to a compensation voltage end of the display panel.

The switch circuit is configured, in case that the feedback voltage is greater than or equal to the target threshold, to output the common voltage and the operating voltage to the operational amplifier circuit and stop outputting the common voltage to the display panel, includes that: in case that the feedback voltage is greater than or equal to the target threshold, the first switch is controlled to switched on via the feedback voltage, a third channel is switched on, and the operating voltage via the first switch is output to the operational amplifier circuit; the first selector is controlled via the feedback voltage to select a first channel to be switched on, and the common voltage via the first selector is output to the operational amplifier circuit; the first selector is controlled via the feedback voltage to select a second channel to be switched off, and the first selector stops outputting the common voltage to the display panel.

The switch circuit is also configured, in case that the feedback voltage is smaller than the target threshold, to output the common voltage to the display panel and stop outputting the common voltage and the operating voltage to the operational amplifier circuit, includes that: in case that the feedback voltage is smaller than the target threshold, the first switch is controlled to be switched off via the feedback voltage, the third channel is switched off, and the first switch to stop outputting the operating voltage to the operational amplifier circuit; the first selector is controlled via the feedback voltage to select the first channel to be switched off, and the first selector stops outputting the common voltage to the operational amplifier circuit; and the first selector is controlled via the feedback voltage to select the second channel to be switched on, and the common voltage via the first selector is output to the display panel.

As an optional implementation of the embodiments of the present application, the first channel is used to indicate a channel for power supplying of the common voltage between the power management circuit and the operational amplifier circuit. The second channel is used to indicate a channel for power supplying of the common voltage between the power management circuit and the display panel. The third channel is used to indicate a channel for power supplying of the operating voltage between the power management circuit and the operational amplifier circuit.

As an optional implementation of the embodiments of the present application, the switch circuit includes a first selector, a second selector and a first switch. A first voltage end of the first selector is in connection with an output end of the timing controller, a second voltage end of the first selector is in connection with a third output end of the power management circuit, the power management circuit is configured to output a reference voltage to the second voltage end of the first selector, a third voltage end of the first selector is in connection with a first output end of the power management circuit, and the power management circuit is configured to output the common voltage to the third voltage end of the first selector.

A first output end of the first selector is respectively connected to a first input end of the operational amplifier circuit and a third voltage end of the second selector, the first selector is configured to output a first common voltage to the third voltage end of the second selector, and the first selector is configured to output a second common voltage to the first input end of the operational amplifier circuit. A second output end of the first selector is connected to a second common voltage end of the display panel, and the first selector is configured to output the second common voltage to the display panel.

A first voltage end of the second selector is in connection with a first feedback voltage end of the display panel, a second voltage end of the second selector is in connection with a fourth output end of the power management circuit, and the power management circuit is configured to output the target threshold to the second voltage end of the second selector. A first output end of the second selector is respectively connected to a first compensation voltage end of the display panel and a first output end of the operational amplifier circuit, and a second output end of the second selector is connected to a first common voltage end of the display panel.

A control end of the first switch is in connection with the output end of the timing controller, an input end of the first switch is in connection with a second output end of the power management circuit, and an output end of the first switch is connected to a power supply end of the operational amplifier circuit. A first group of inverting input ends of a second input end of the operational amplifier circuit is in connection with the first feedback voltage end of the display panel; a second group of inverting input ends of the second input end of the operational amplifier circuit is in connection with a second feedback voltage end of the display panel; and a second output end of the operational amplifier circuit is connected to a second compensation voltage end of the display panel.

As an optional implementation of the embodiment of the present application, under a control of a high level of PDF signal, under a control of the high level of PDF signal, the first switch is switched off, and the first switch stops outputting the operating voltage to the operational amplifier circuit. The first selector is configured to output the common voltage to the display panel and stop outputting the common voltage to the operational amplifier circuit and the second selector; the second selector is disabled. The operational amplifier circuit is configured to stop outputting a second compensation voltage to the display panel, stop receiving a first feedback voltage and a second feedback voltage output from the display panel, stop receiving the second common voltage output from the first selector, and stop outputting a first compensation voltage to the second selector.

Under a control of the low level of PDF signal, the first switch is switched on, and the operating voltage via the first switch is output to the operational amplifier circuit. The first selector is configured to output the second common voltage to the operational amplifier circuit, output the first common voltage to the second selector, and stop outputting the second common voltage to the display panel. The operational amplifier circuit is configured to receive the second common voltage output from the first selector, receive the first feedback voltage and the second feedback voltage output from the display panel, output the second compensation voltage to the display panel, and output the first compensation voltage to the second selector. The second selector is configured to output the first compensation voltage or the first common voltage to the display panel according to a magnitude relationship between the first feedback voltage and the target threshold.

As an optional implementation of the embodiments of the present application, the second selector is configured to output the first compensation voltage or the first common voltage to the display panel according to the magnitude relationship between the first feedback voltage and the target threshold, includes that: the second selector is configured, in case that the first feedback voltage is greater than or equal to the target threshold, to output the first compensation voltage; and the second selector is configured, in case that the first feedback voltage is smaller than the target threshold, to outputs the first common voltage.

In accordance with a second aspect of the embodiments of the present application, a display device is provided, which includes a display panel and a compensation circuit of any one of the first aspect mentioned above. The display panel is configured to display a screen, output a feedback voltage to the compensation circuit, and receive the PDF signal, the compensation voltage and the common voltage output from the compensation circuit.

Compared with the existing technologies, the technical solution provided by the present application can further determine, according to the magnitude relationship between the feedback voltage and the target threshold, whether the display problem of a relatively mild degree occurring in the current display panel needs to be further improved by the common-voltage compensation method, thereby the power consumption can be reduced.

DETAILED DESCRIPTION OF EMBODIMENTS

The embodiments of the present application are described below in conjunction with the drawings in the embodiments of the present application. The terms used in the detailed description of the embodiments of the present application are only intended to explain specific embodiments of the present application, and are not intended to limit the present application. The following specific embodiments may be combined with each other, and the same or similar concepts or processes may not be repeated in some embodiments.

At present, display panels often have some common display problems, such as crosstalk, greenish (referring to an incomplete transmission of three primary colors of red, green and blue, resulting in a green screen), etc. Herein, the crosstalk may be divided into ordinary crosstalk (a phenomenon of crosstalk occurring between two adjacent pixels) and Crosstalk (a phenomenon that the picture in a certain region of the screen affects the brightness of the adjacent region). In the existing technologies, the timing controller can detect and indicate the severity of the display problem of the display panel. For example, when a target display problem occurs (i.e., the severity of crosstalk or greenish is relatively serious, that is, a special display problem), the PDF function is turned on, and a high level of PDF signal is output from the timing controller to indicate that the display panel has a serious display problem. Correspondingly, at this time, a polarity inversion method is usually used to change a driving mode of the liquid crystal screen in the display panel, so as to eliminate the above display problem and improve the display quality of the display panel. Herein, the changing of polarity inversion mode may be controlled by a high level of PDF signal, and the polarity inversion includes: a frame inversion, a column inversion, a row inversion and a dot inversion. Au update rate of the screen under different polarity inversions is different, and the required power consumption is also different.

When a non-target display problem occurs (i.e., the severity of crosstalk or greenish is relatively mild, that is, a general display problem), the PDF function is not on (equivalent to the PDF function being turned off), and the timing controller can output a low level of PDF signal to indicate that the display panel has a general display problem. Correspondingly, at this time, the common-voltage (Voltage Common Mode, VCOM) compensation method is usually used to eliminate the above display problems and improve the display quality of the display panel.

Figure 1:
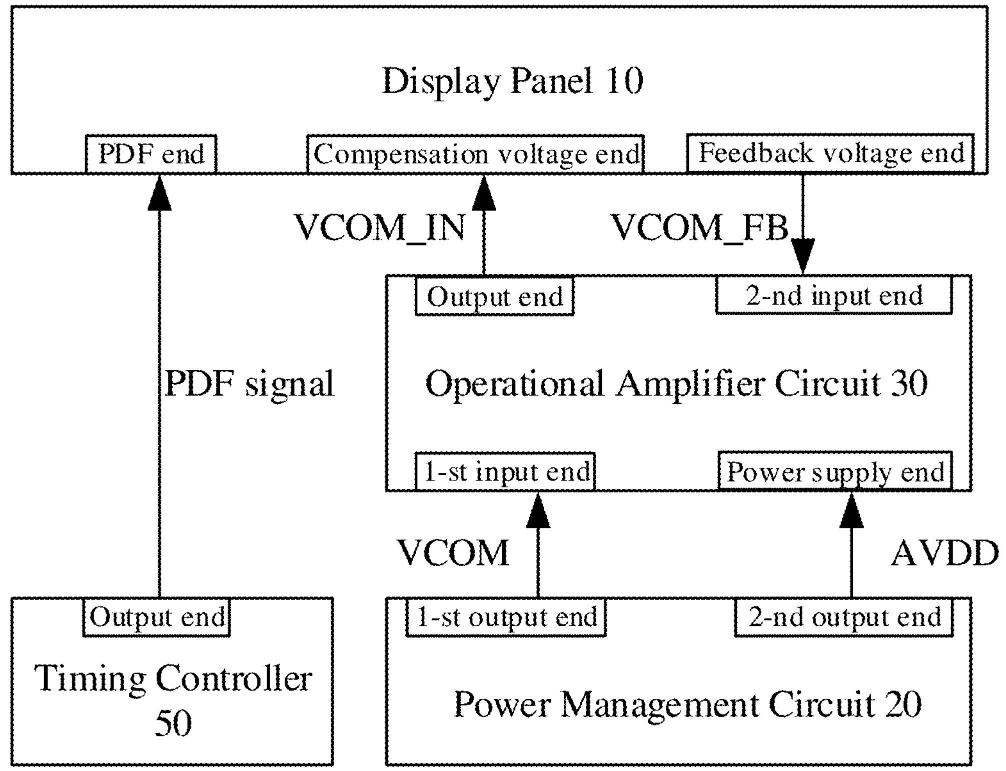
FIG. 1 is a structural schematic diagram of an existing compensation circuit.

The following will illustrate the connection relationship and working principle of the existing compensation circuit with reference to FIG. 1.

FIG. 1 is a structural schematic diagram of an existing compensation circuit. As shown in FIG. 1, the compensation circuit includes a display panel 10, a timing controller 50, a power management circuit 20 and an operational amplifier circuit 30. The timing controller 50 is connected to the display panel 10 through a wiring, and is configured to provide a PDF signal to the display panel 10. A first output end of the power management circuit 20 is connected to a first input end of the operational amplifier circuit 30, and a second output end of the power management circuit 20 is connected to a power supply end of the operational amplifier circuit 30. A second input end of the operational amplifier circuit 30 is in connection with a feedback voltage end of the display panel 10, and an output end of the operational amplifier circuit 30 is connected to a compensation voltage end of the display panel 10.

Herein, the PDF signal is used to instruct the display panel 10 to reverse a polarity and change a driving mode of the liquid crystal.

The power management circuit 20 is configured to provide a common voltage VCOM and an operating voltage AVDD required for operation of the operational amplifier circuit 30 to the operational amplifier circuit 30. The operational amplifier circuit 30 is configured to receive a feedback voltage VCOM_FB provided by the display panel 10 and provide a compensation voltage VCOM_IN to the display panel 10 after calculation on the common voltage VCOM and the feedback voltage VCOM_FB.

The working principle of FIG. 1 is as follows: when it is detected by the timing controller 50 that the display problem of the display panel 10 is a non-target display problem, a low level of PDF signal is output from the timing controller 50 to the display panel 10, then, it is indicated that the display problem is the non-target display problem, and only VCOM compensation (i.e., the common-voltage compensation method) is required to solve the display problem.

Particularly, the operational amplifier circuit 30, upon receiving the operating voltage AVDD provided by the power management circuit 20, is in a working state, meanwhile, the common voltage VCOM provided by the power management circuit 20 and the feedback voltage VCOM_FB provided by the display panel 10 are also received by the operational amplifier circuit 30. Then, the operational amplifier circuit 30 is configured to determine a compensation multiple according to a ratio of an internal feedback resistance and an input resistance and output the compensation voltage VCOM_IN to the display panel 10 according to the compensation multiple, to compensate the common voltage in the display panel 10, thereby the display problem of the display panel 10 is solved.

Herein, the operational amplifier circuit 30 in the working state is enabled to receive the common voltage VCOM output from the power management circuit 20, receive the feedback voltage VCOM_FB output from the display panel 10, determine the compensation voltage VCOM_IN based on the common voltage VCOM and the feedback voltage VCOM_FB, and then output the compensation voltage VCOM_IN to the display panel 10.

When it is detected by the timing controller 50 that the display problem of the display panel 10 is a target display problem, a high level of PDF signal is input by the timing controller 50 to the display panel 10, at this time, it is indicated that the display problem is the target display problem, and the display problem can only be solved by changing the driving mode of the liquid crystal in the display panel 10.

Particularly, after the high level of PDF signal is received by the display panel 10, the existing driving mode of the liquid crystal in the display panel 10 will be changed to drive the display panel 10 in another driving mode, thereby the display problem of the display panel 10 is improved. For example, the driving mode of the liquid crystal is a row inversion in case that the PDF signal is a low-level signal. The driving mode of the liquid crystal will be changed from the row inversion to a column inversion in case that the PDF signal is a high-level signal. Because in the driving mode of column inversion, the number of inversions of the liquid crystal increases, and the display quality will be improved, thus, the display problem of the display panel 10 will be improved.

Through the above expression of the working principle of the compensation circuit in the existing technologies, it can be known that in the existing technologies, when the PDF signal is at a low level, the VCOM compensation method is adopted by the compensation circuit to improve the non-target display problem of the display panel.

However, the non-target display problem can be divided into a first type of non-target display problem and a second type of non-target display problem. The first type of non-target display problem is used to indicate that the non-target display problem of the display panel 10 is relatively light (that is, the display panel has a slight flaw in display), and the second type of non-target display problem is used to indicate that the non-target display problem of the display panel 10 is relatively heavy. VCOM compensation is not required when the display problem is the first type of non-target display problem, and the VCOM compensation is required only when the display problem is the second type of non-target display problem. The compensation circuit provided in the existing technologies will not further determine whether the VCOM compensation method needs to be used when the PDF signal is a low-level signal. As a result, the accuracy of the compensation circuit is low and the power consumption is high.

In view of this, the embodiments of the present application provide a compensation circuit and a display device to improve the accuracy of compensation when the PDF signal is at a low level, and further reduce the power consumption of the compensation circuit. Herein, the compensation circuit includes: a power management circuit, an operational amplifier circuit and a switch circuit. The power management circuit is connected to the switch circuit and configured to output a common voltage and an operating voltage to the switch circuit. The switch circuit is respectively connected to the display panel and the operational amplifier circuit. The operational amplifier circuit is connected to the display panel. The switch circuit and the operational amplifier circuit are respectively configured to receive a feedback voltage output from the display panel. The switch circuit is configured, in case that the feedback voltage is greater than or equal to a target threshold, to output the common voltage and the operating voltage to the operational amplifier circuit and stop outputting the common voltage to the display panel. The operational amplifier circuit is configured to receive the common voltage and the operating voltage output from the switch circuit, and output a compensation voltage to the display panel. The switch circuit is also configured, in case that the feedback voltage is smaller than the target threshold, to output the common voltage to the display panel and stop outputting the common voltage and the operating voltage to the operational amplifier circuit. The operational amplifier circuit is also configured to stop receiving the feedback voltage output from the display panel, and stop outputting the compensation voltage to the display panel.

In the compensation circuit according to the embodiments of the present application, a detection of the feedback voltage VCOM_FB on the basis of the original detection of the PDF signal is added, and a detection priority of the compensation circuit to the PDF signal is higher than a detection priority to the feedback voltage VCOM_FB.

The magnitude of the feedback voltage VCOM_FB can reflect whether the non-target display problem of the display panel 10 is a first-type of non-target display problem or a second-type of non-target display problem. That is, in case that the feedback voltage VCOM_FB is greater than or equal to the target threshold, indicating that the non-target display problem of the display panel 10 is the second-type of non-target display problem, at this time, the VCOM compensation is required, and the switch circuit 40 needs to output the compensation voltage VCOM_IN to the display panel 10, and does not need to output the common voltage VCOM to the display panel 10. In case that the feedback voltage VCOM_FB is smaller than the target threshold, indicating that the non-target display problem of the display panel 10 is a first-type of non-target display problem, at this time, the VCOM compensation is not required, and the switch circuit 40 needs to output the common voltage VCOM to the display panel 10, and does not need to output the compensation voltage VCOM_IN to the display panel 10.

In the embodiments of the present application, the compensation circuit can further determine, according to the magnitude relationship between the feedback voltage and the target threshold value, whether the display problem of a relatively mild degree occurring in the current display panel needs to be further improved by the common-voltage compensation method when the PDF signal is at a low level. When the problem needs to be improved by the common-voltage compensation method, the compensation voltage is output from the compensation circuit to the display panel; and when the problem does not need to be improved by the common-voltage compensation method, the common voltage is output from the compensation circuit to the display panel. Thereby the accuracy of compensation of the compensation circuit when the PDF signal is at a low level can be improved, which then can further reduce the power consumption.

The compensation circuit according to the embodiments of the present application is described in detail below.

Figure 2:
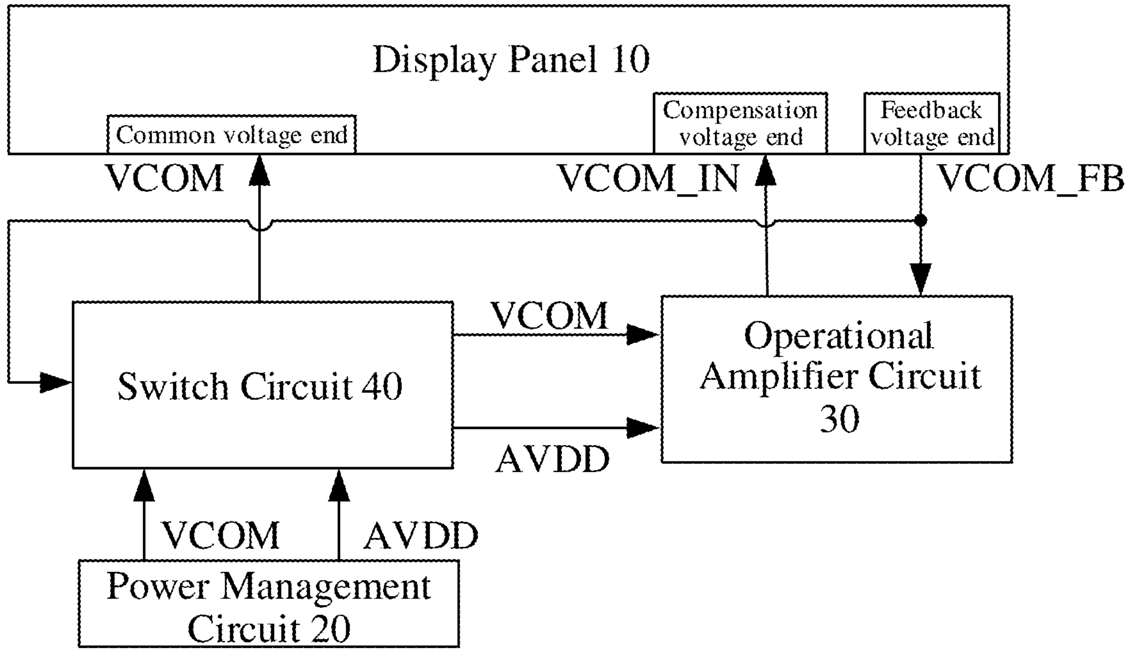
FIG. 2 is a structural schematic diagram of a compensation circuit provided in an embodiment of the present application.
Figure 3:
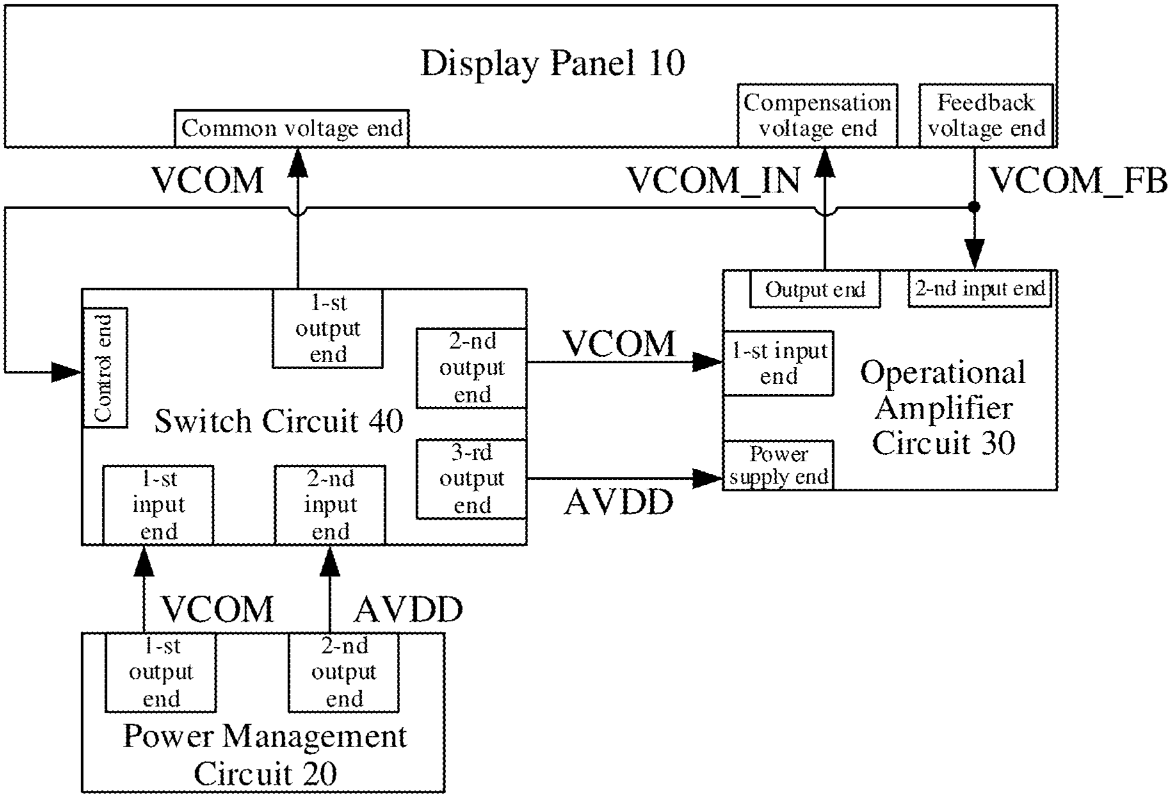
FIG. 3 is a structural schematic diagram of a compensation circuit provided in an embodiment of the present application.
Figure 4A:
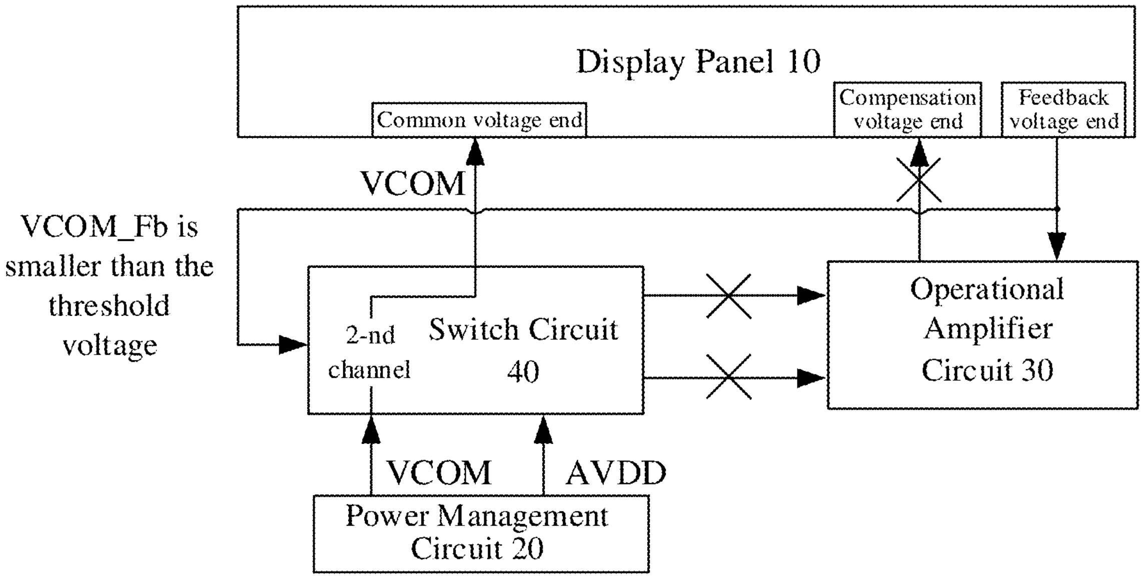
FIG. 4A and FIG. 4B show equivalent structural schematic diagrams of a compensation circuit corresponding to different VCOM_FB signals.
Figure 4B:
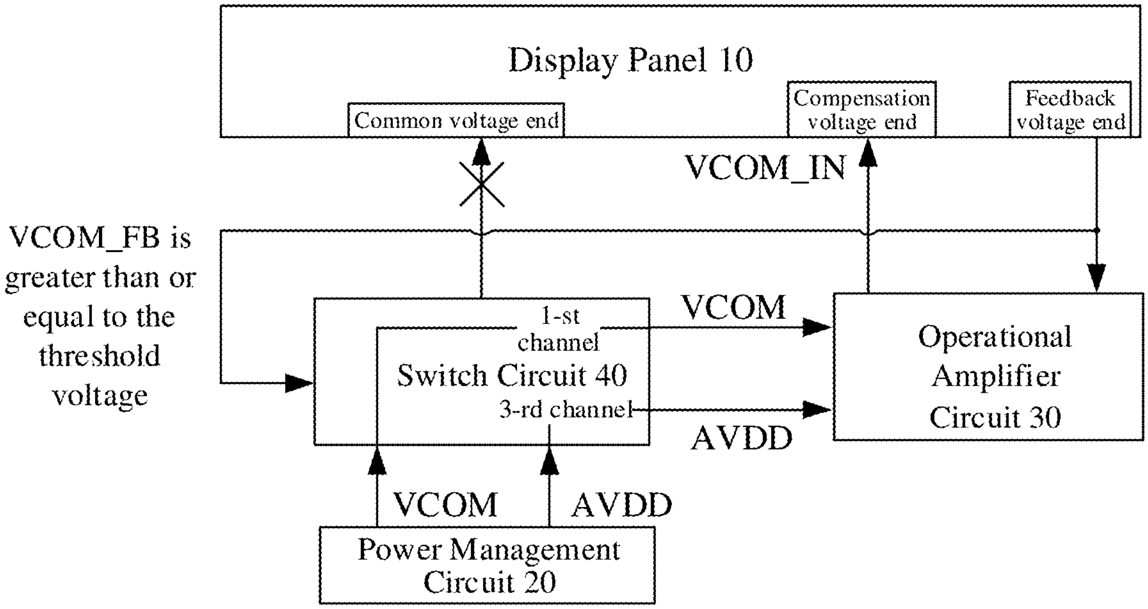

FIGS. 2 and 3 respectively show a schematic structural schematic diagram of a compensation circuit according to the embodiments of the present application, and FIG. 4A and FIG. 4B are equivalent structural schematic diagrams of a compensation circuit corresponding to different VCOM_FB signals. It should be noted that the embodiment provided in here is carried out when the PDF signal is at a low level.

As shown in FIGS. 2 to 4B, the compensation circuit includes: a power management circuit 20, a switch circuit 40 and an operational amplifier circuit 30. For ease of understanding, various ports are presented in FIG. 3 relative to FIG. 2.

As shown in FIG. 3, a first output end of the power management circuit 20 is connected to a first input end of the switch circuit 40, and a second output end of the power management circuit 20 is connected to a second input end of the switch circuit 40, so as to output a common voltage VCOM and an operating voltage AVDD to the switch circuit 40.

A first output end of the switch circuit 40 is connected to a common voltage end of the display panel 10, a control end of the switch circuit 40 is in connection with a feedback voltage end of the display panel 10, a second output end of the switch circuit 40 is connected to a first input end of the operational amplifier circuit 30, and a third output end of the switch circuit 40 is connected to a power supply end of the operational amplifier circuit 30.

An output end of the operational amplifier circuit 30 is connected to a compensation voltage end of the display panel 10, and a second input end of the operational amplifier circuit 30 is in connection with the feedback voltage end of the display panel 10.

The switch circuit 40 and the operational amplifier circuit 30 are respectively configured to receive the feedback voltage VCOM_FB output from the display panel 10. The switch circuit 40 is configured, in case that the feedback voltage VCOM_FB is greater than or equal to the target threshold, to output the common voltage VCOM and the operating voltage AVDD to the operational amplifier circuit 30 and stop outputting the common voltage VCOM to the display panel 10. The operational amplifier circuit 30 is configured to receive the common voltage VCOM and the operating voltage AVDD output from the switch circuit 40, and output the compensation voltage VCOM_IN to the display panel 10.

The switch circuit 40 is also configured, in case that the feedback voltage VCOM_FB is smaller than the target threshold, to output the common voltage VCOM to the display panel 10 and stop outputting the common voltage VCOM and the operating voltage AVDD to the operational amplifier circuit 30. The operational amplifier circuit 30 is also configured to stop receiving the feedback voltage VCOM_FB output from the display panel 10, and stop outputting the compensation voltage VCOM_IN to the display panel 10.

Herein, the display panel 10 is configured to display a screen, receive the common voltage VCOM provided by the switch circuit 40, provide the feedback voltage VCOM_FB to the operational amplifier circuit 30 and the switch circuit 40, and receive the compensation voltage VCOM_IN provided by the operational amplifier circuit 30.

It should be noted that a waveform analysis circuit (not shown) may be connected to a feedback voltage end of the display panel 10 to determine a magnitude of a waveform of the feedback voltage VCOM_FB and a relationship between the feedback voltage and the target threshold. Herein, the target threshold is a preset value, which is not particularly limited in the embodiments of the present application. For the sake of description, in the following, a feedback voltage VCOM_FB greater than or equal to the target threshold is referred to as a second target feedback voltage, and a feedback voltage VCOM_FB smaller than the target threshold is referred to as a first target feedback voltage.

The display panel 10 may be a liquid crystal display (LCD), an organic light-emitting diode (OLED), a twisted nematic (TN) display panel, a vertical alignment (VA) display panel, etc., which is not particularly limited in the embodiments of the present application.

Figure 7:
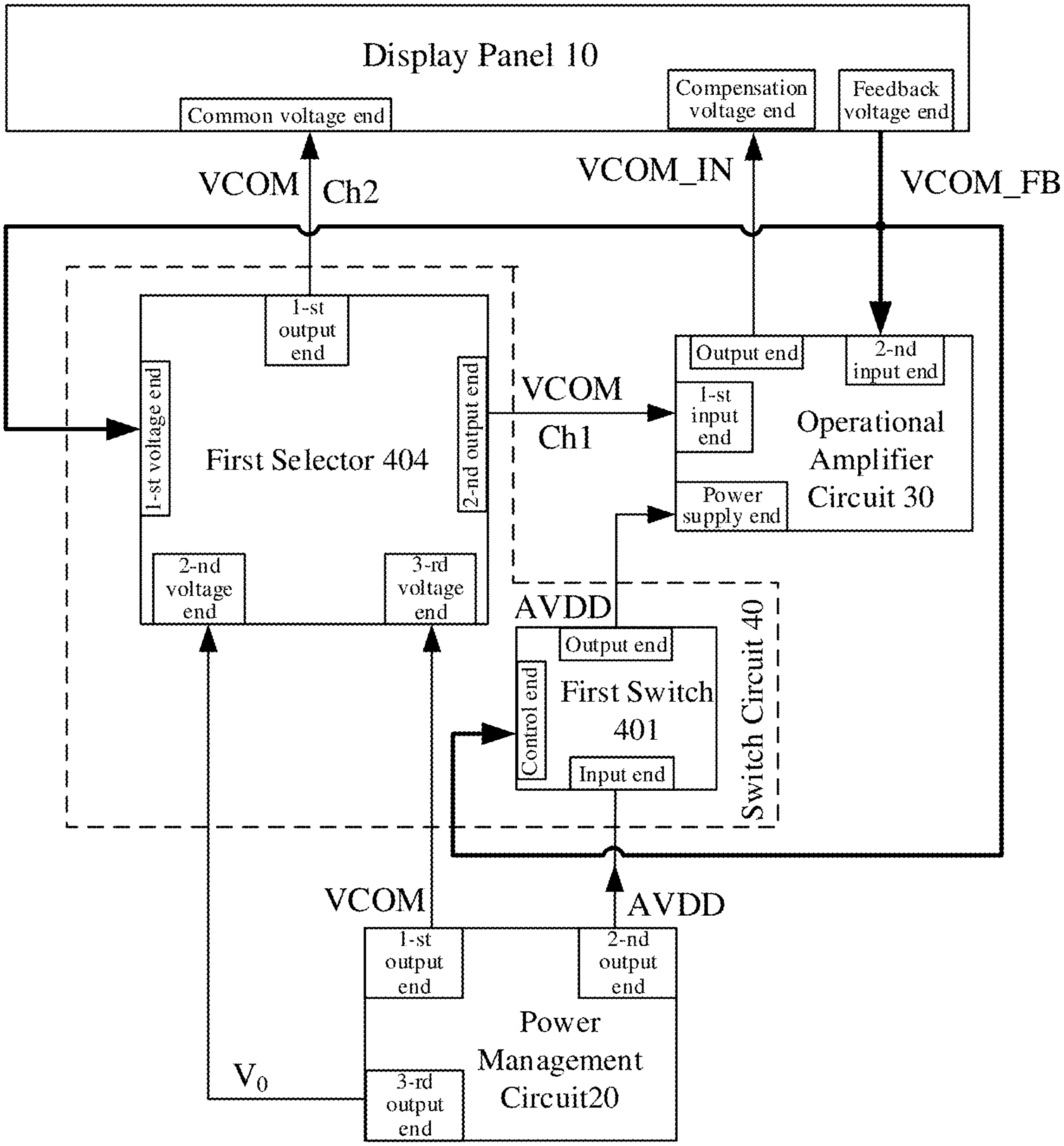
FIG. 7 is a structural schematic diagram of a compensation circuit including one switch and one selector provided in an embodiment of the present application.
Figure 8:
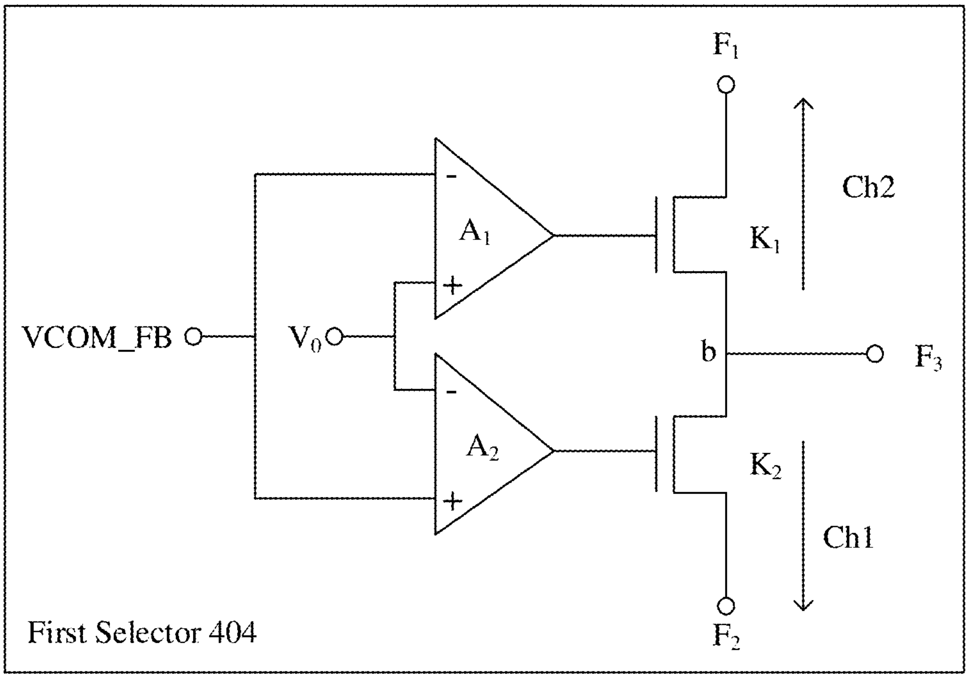
FIG. 8 is a specific structural schematic diagram of a first selector provided in an embodiment of the present application.
Figure 9:
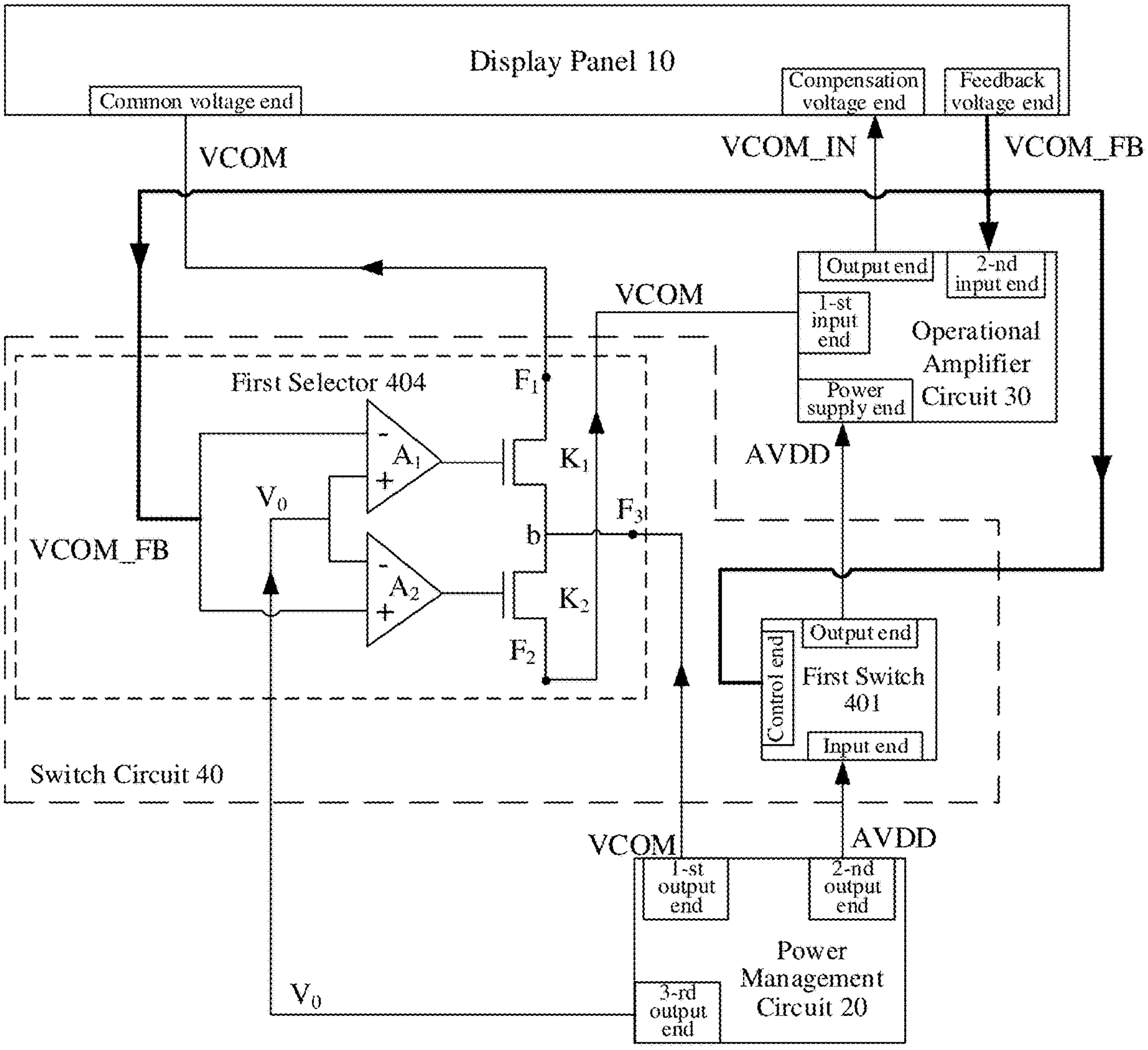
FIG. 9 is a specific structural schematic diagram of the compensation circuit including one switch and one selector provided in an embodiment of the present application.
Figure 10:
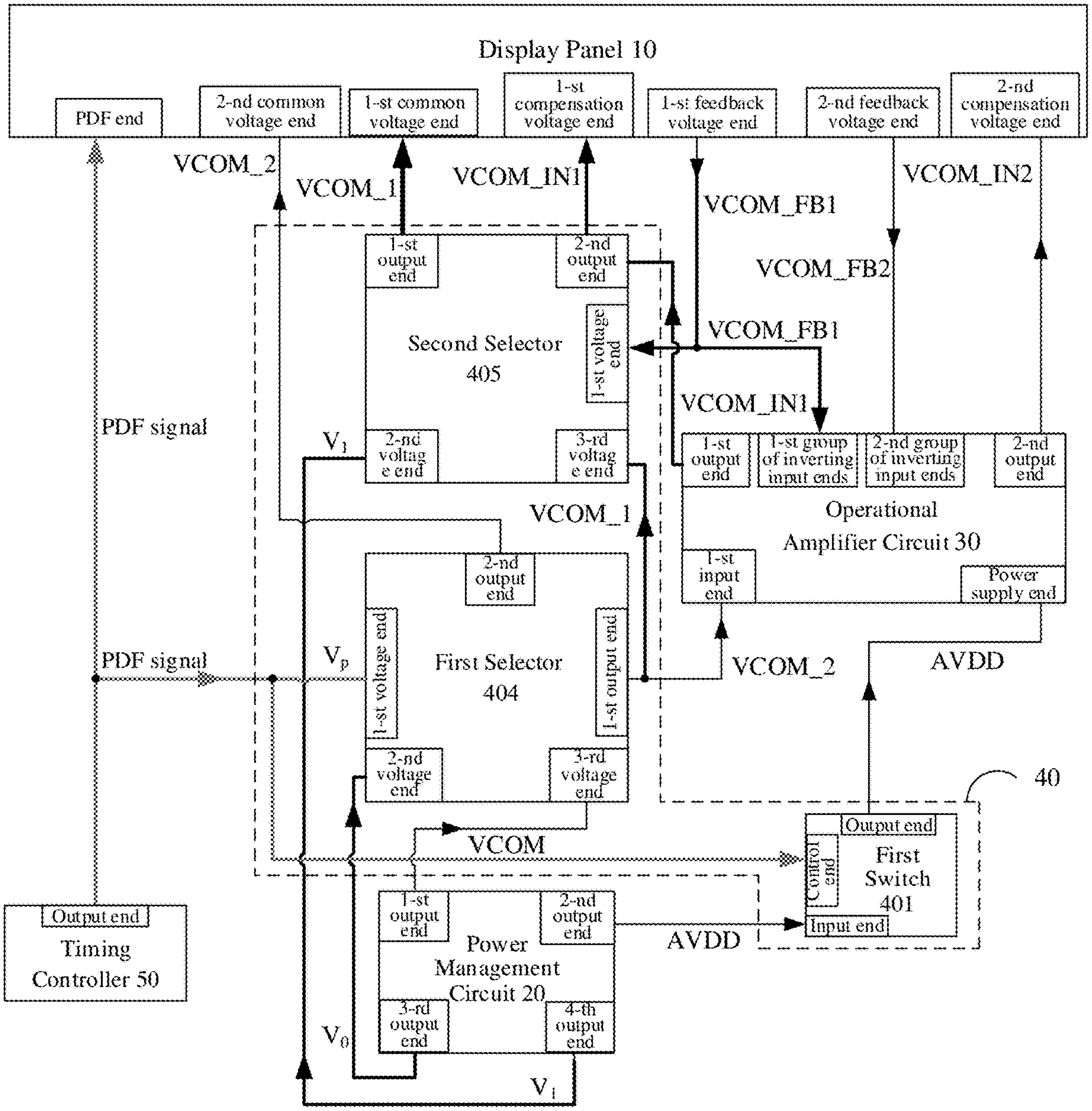
FIG. 10 is a structural schematic diagram of a compensation circuit including two selectors and one switch provided in an embodiment of the present application.
Figure 11:
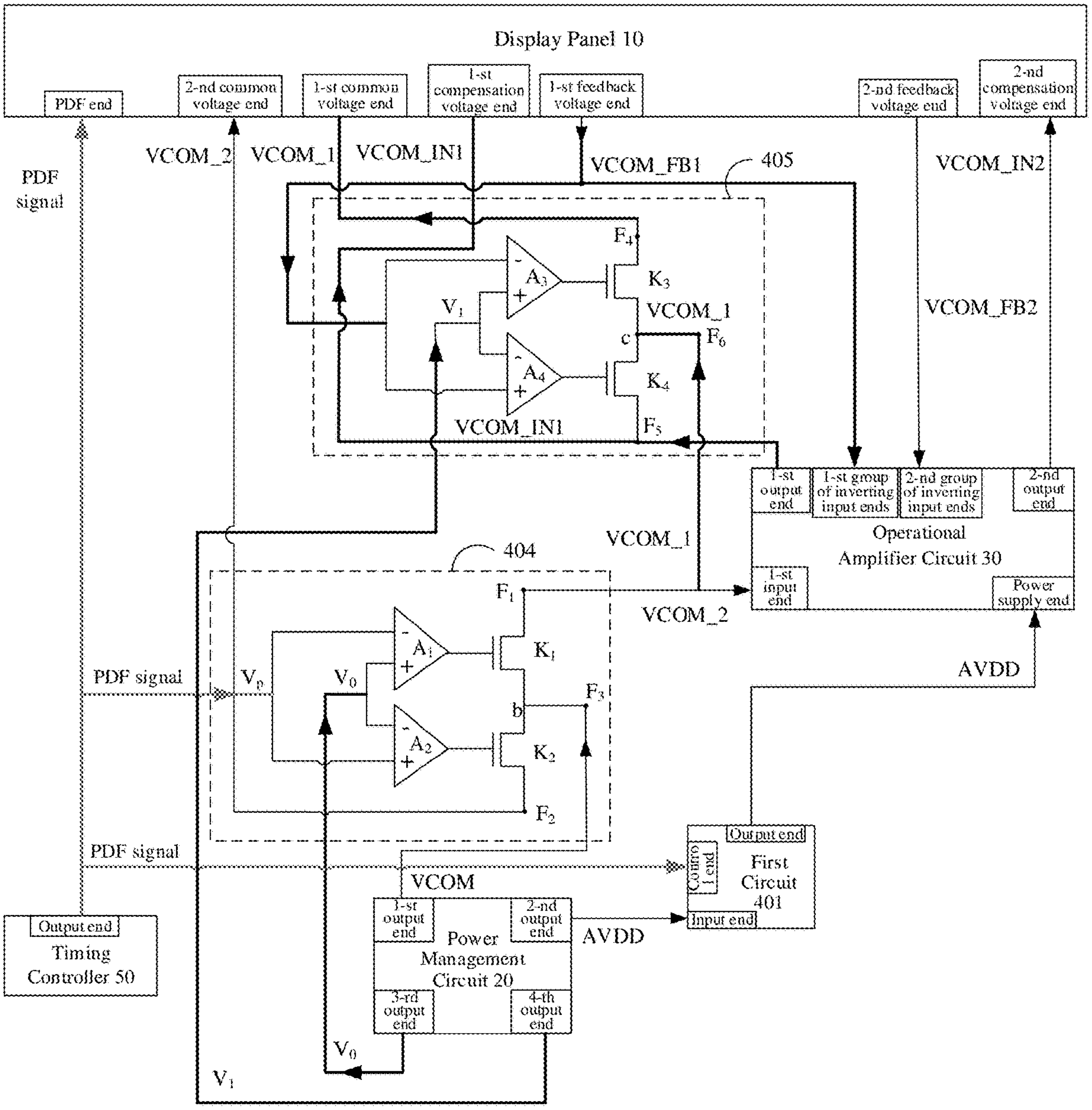
FIG. 11 is a specific structural schematic diagram of the compensation circuit including two selectors and one switch provided in an embodiment of the present application.

The power management circuit 20 may be a power management integrated circuit (Power Management IC, PMIC), or a gamma correction buffer circuit chip (P_gamma), etc., which is not particularly limited in the embodiments of the present application. It should be noted that the power management circuit 20 may generate multiple voltage values, to provide different required voltages to different components. For example, as shown in FIGS. 2 to 6, the first output end of the power management circuit 20 is configured to output the common voltage VCOM, and the second output end of the power management circuit 20 is configured to output an operating voltage AVDD. As shown in FIGS. 7 to 9, the power management circuit 20 also has a third output end configured to output a first reference voltage $V_0$. As shown in FIGS. 10 and 11, the power management circuit 20 also has a fourth output end configured to output a second reference voltage. In actual applications, the power management circuit 20 may also generate other voltages according to demands.

The operational amplifier circuit 30 may include one operational amplifier, and may also include multiple operational amplifiers, which is not particularly limited in the embodiments of the present application.

In case that the operational amplifier circuit 30 includes only one operational amplifier, the first input end of the operational amplifier circuit 30 is a non-inverting input end (i.e., "+", not shown in the figures) of the operational amplifier in the operational amplifier circuit 30. The second input end of the operational amplifier circuit 30 is an inverting input end (i.e., "−", not shown in the figures) of the operational amplifier in the operational amplifier circuit 30. The power supply end of the operational amplifier circuit 30 is a power supply end of the operational amplifier (not shown) in the operational amplifier circuit 30. The output end of the operational amplifier circuit 30 is an output end of the operational amplifier (not shown) in the operational amplifier circuit 30

In case that the operational amplifier circuit 30 includes multiple operational amplifiers, non-inverting input ends (i.e., "+", not shown in the figure) of all operational amplifiers in the operational amplifier circuit 30 are integrated together to form the first input end of the operational amplifier circuit 30; and power supply ends of all operational amplifiers are integrated together to form the power supply end of the operational amplifier circuit 30. In this way, the number of interfaces can be reduced and the size of the device can be reduced.

Inverting input ends (i.e., "−", not shown in the figures) of all operational amplifiers may be integrated together to form the second input end of the operational amplifier circuit 30, or may be integrated into different numbers of second input ends according to the number of feedback voltage ends of the display panel 10. For example, when the number of feedback voltage ends of the display panel 10 is 2, the inverting input ends of all operational amplifier may be integrated in two parts to respectively form a first group of inverting input ends and a second group of inverting input ends.

Output ends of all operational amplifiers may be integrated together to form the output end of the operational amplifier circuit 30, or may be integrated into the output ends according to the number of integrated second input ends. For example, if the operational amplifier circuit 30 has two second input ends, then the output ends of all operational amplifiers are integrated in two parts to form a first output end and a second output end, respectively. The first output end corresponds to the second group of inverting input ends, and the second output end corresponds to the second group of inverting input ends.

It should be noted that the operational amplifier circuit 30 is configured to be switched to a working state when receiving the operating voltage AVDD output from the switch circuit 40, to be switched a stopped state (or switched to an off-working state) when the operating voltage AVDD output from the switch circuit 40 cannot be received. The operational amplifier circuit 30 in the working state has been discussed above, and will not be repeated here. Here, only the operational amplifier circuit 30 in the stopped state is described. The operational amplifier circuit 30 in the stopped state stops receiving the common voltage VCOM output from the switch circuit 40. The compensation multiple cannot be determined according to the ratio of the internal feedback resistor and the input resistor, the compensation voltage VCOM_IN can no longer be output to the display panel 10 according to the compensation multiple, and the receiving of the feedback voltage VCOM_FB output from the display panel 10 is stopped.

The switch circuit 40 may include multiple switches, such as three switches. The switch circuit 40 may also include one switch and one selector. The switch circuit 40 may also include two selectors and one switch. The embodiments of the present application do not have specifically limitations on this.

As shown in FIG. 4A, in case that the feedback voltage VCOM_FB is smaller than the target threshold, indicating that the non-target display problem of the display panel 10 is the first type of non-target display problem, at this time, the compensation circuit does not need to perform the VCOM compensation method, then a second channel Ch2 is switched on via the switch circuit 40 to output the common voltage VCOM to the display panel 10, a first channel Ch1 is switched off via the switch circuit 40 to stop outputting the common voltage VCOM to the operational amplifier circuit 30, and a third channel Ch3 is switched off via the switch circuit 40 to stop outputting the operating voltage AVDD to the operational amplifier circuit 30. The operational amplifier circuit 30 is switched to the stopped state.

As shown in FIG. 4B, in case that the feedback voltage VCOM_FB is greater than or equal to the target threshold, indicating that the non-target display problem of the display panel 10 is a second type of non-target display problem, and the VCOM compensation method needs to be used, then the second channel Ch2 is switched off via the switch circuit 40, and the switch circuit 40 stops outputting the common voltage VCOM to the display panel 10, the first channel Ch1 is switched on via the switch circuit 40 to output the common voltage VCOM to the operational amplifier circuit 30, and the third channel Ch3 is switched on via the switch circuit 40 to output the operating voltage AVDD to the operational amplifier circuit 30. The operational amplifier circuit 30 is switched to the working state.

Herein, the first channel Ch1 refers to a channel for power supplying of common voltage VCOM between the power management circuit 20 and the operational amplifier circuit 30. The second channel Ch2 refers to a channel for power supplying of the common voltage VCOM between the power management circuit 20 and the display panel 10; the third channel Ch3 refers to a channel for power supplying of the operating voltage AVDD between the power management circuit 20 and the operational amplifier circuit 30.

In the embodiments of the present application, the compensation circuit provided can further determine, according to the magnitude relationship between the feedback voltage and the target threshold value, whether the display problem of a relatively mild degree occurring in the current display panel needs to be further improved by the common-voltage compensation method when the PDF signal is at a low level. When the problem needs to be improved by the common-voltage compensation method, the compensation voltage is output from the compensation circuit to the display panel; and when the problem does not need to be improved by the common-voltage compensation method, the common voltage is output from the compensation circuit to the display panel. Thereby, the accuracy of compensation of the compensation circuit when the PDF signal is at a low level can be improved, which then can further reduce the power consumption.

The switch circuit 40 according to the embodiments of the present application is shown and introduced below.

It should be noted that the embodiments here are carried out when the PDF signal is a low-level signal.

Figure 5:
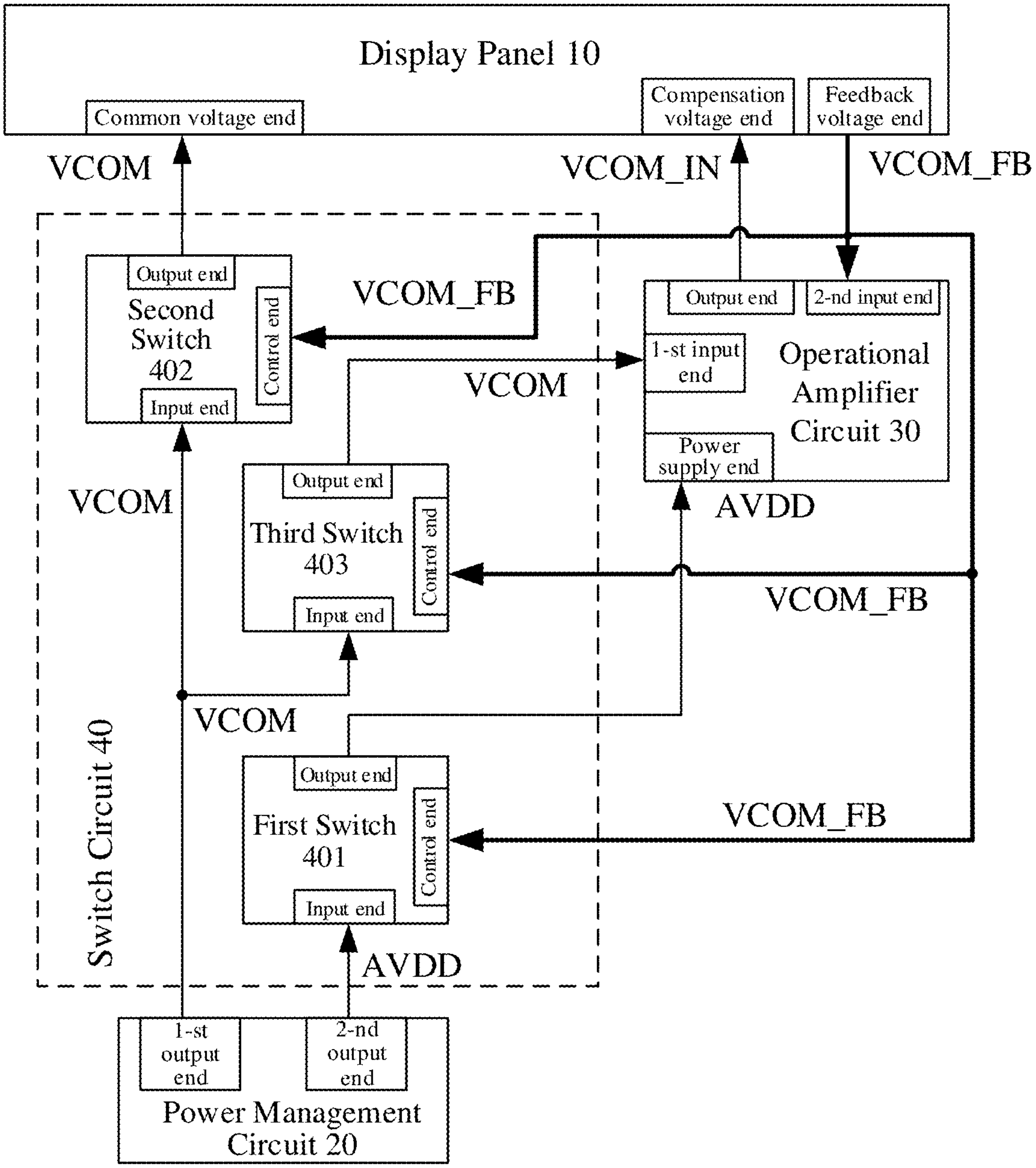
FIG. 5 is a structural schematic diagram of a compensation circuit including three switches provided in an embodiment of the present application.

In order to reduce power consumption, as an optional implementation, the switch circuit may include three switches, as shown in FIG. 5.

FIG. 5 is a structural schematic diagram of a compensation circuit including three switches provided in an embodiment of the present application;

The compensation circuit includes: a power management circuit 20, an operational amplifier circuit 30 and a switch circuit 40. Herein, the switch circuit 40 includes a first switch 401, a second switch 402 and a third switch 403.

Particularly, the feedback voltage end of the display panel 10 is respectively connected to the second input end of the operational amplifier circuit 30, a control end of the first switch 401, a control end of the second switch 402 and a control end of the third switch 403, and configured to provide the feedback voltage VCOM_FB to the operational amplifier circuit 30, the first switch 401, the second switch 402 and the third switch 403 respectively.

An input end of the first switch 401 is in connection with the second output end of the power management circuit 20, and configured to receive the operating voltage AVDD output from the power management circuit 20. An output end of the first switch 401 is connected to the power supply end of the operational amplifier circuit 30, and configured to output the operating voltage AVDD to the operational amplifier circuit 30.

An input end of the second switch 402 is in connection with the first output end of the power management circuit 20, and configured to receive the common voltage VCOM output from the power management circuit 20. An output end of the second switch 402 is connected to the common voltage end of the display panel 10, and configured to output the common voltage VCOM to the display panel 10.

An input end of the third switch 403 is in connection with the first output end of the power management circuit 20, and configured to receive the common voltage VCOM output from the power management circuit 20. An output end of the third switch 403 is connected to the first input end of the operational amplifier circuit 30, and configured to output the common voltage VCOM to the operational amplifier circuit 30.

The output end of the operational amplifier circuit 30 is connected to the compensation voltage end of the display panel 10, and configured to output the compensation voltage VCOM_IN to the display panel 10.

Herein, the first switch 401, the second switch 402 and the third switch 403 may be metal-oxide-semiconductor (MOSFET)) field effect transistors, bipolar junction transistors (BJT), or electronic switches such as relays, which are not particularly limited in the embodiments of the present application. Taking that the first switch 401, the second switch 402 and the third switch 403 are MOS transistors as an example for exemplary description.

Herein, MOS transistors may be divided into P-channel metal oxide semiconductor field effect transistors (PMOSFET)) and N-channel metal oxide semiconductor field effect transistors (NMOSFET). PMOSFET has the characteristics of low level conduction and high level cutoff, and NMOSFET has the characteristics of high level conduction and low level cutoff.

The first switch 401, the second switch 402 and the third switch 403 each has a threshold voltage. For the sake of description, the threshold voltage of the first switch 401 is referred to as a first threshold voltage, the threshold voltage of the second switch 402 is referred to as a second threshold voltage, and the threshold voltage of the third switch 403 is referred to as a third threshold voltage.

Herein, the first threshold voltage and the second threshold voltage may be the same or different. The third threshold voltage may be the same or different from the first threshold voltage and the second threshold voltage. The embodiments of the present application do not have particularly limitations on this. In the following, taking that the first threshold voltage is different from the second threshold voltage, and the first threshold voltage is the same as the third threshold voltage as an example for exemplary description.

According to the characteristics of the aforementioned PMOSFET and NMOSFET, and the requirements of the circuit, the first switch 401 in FIG. 5 is NMOSFET, the second switch 402 is PMOSFET, and the third switch 403 is NMOSFET. In this case, the first threshold voltage is smaller than the second target feedback voltage and greater than the first target feedback voltage. When the second target feedback voltage is received, the first switch 401 is switched on, and when the first target feedback voltage is received, the first switch 401 is switched off. The second threshold voltage is smaller than the second target feedback voltage and greater than the first target feedback voltage. When the second target feedback voltage is received, the second switch 402 is switched off, and when the first target feedback voltage is received, the second switch 402 is switched on. The third threshold voltage is the same as the first threshold voltage, which is also smaller than the second target feedback voltage and greater than the first target feedback voltage. When the second target feedback voltage is received, the third switch 403 is switched on, and when the first target feedback voltage is received, the third switch 403 is switched off.

Figure 6:
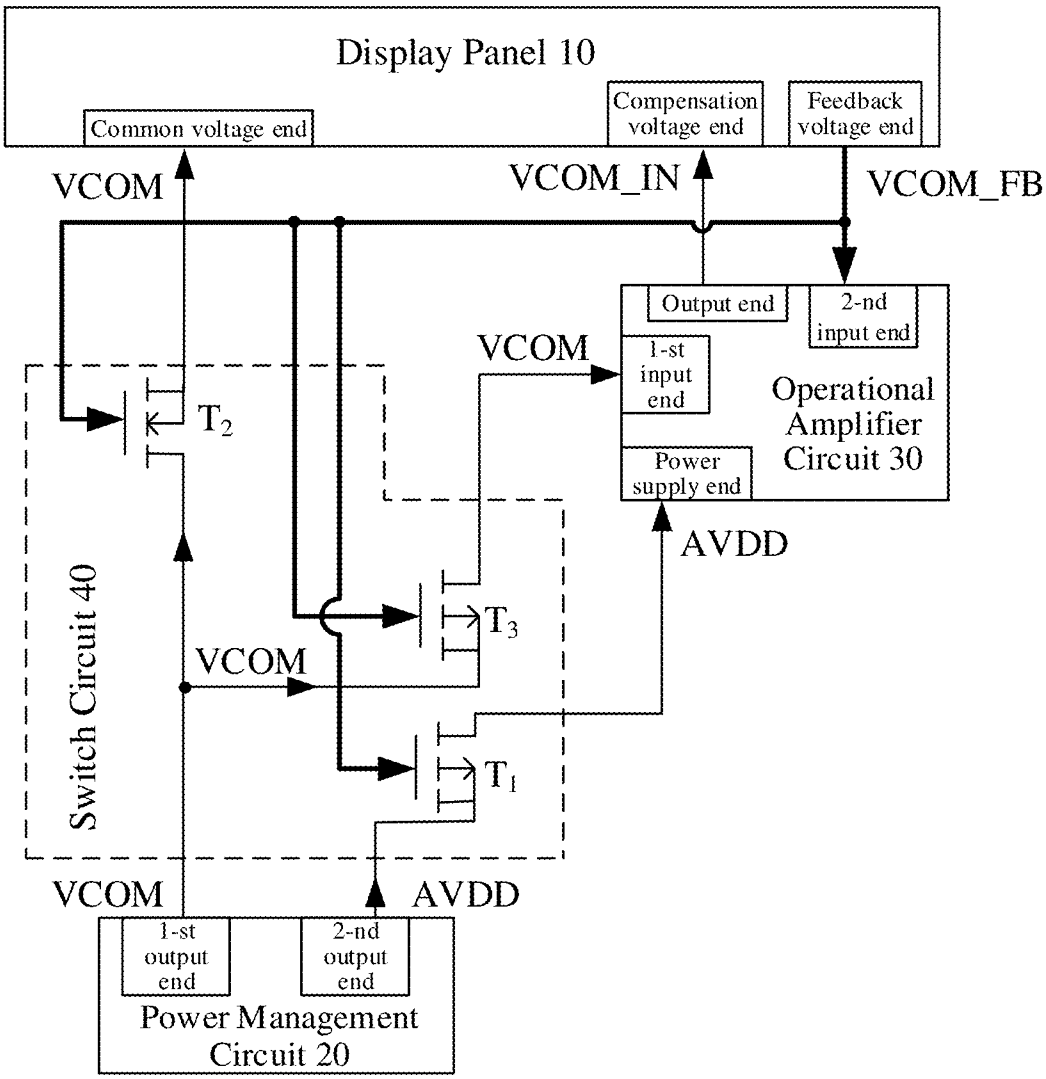
FIG. 6 is a specific structural schematic diagram of the compensation circuit including three switches provided in an embodiment of the present application.

In the case that the first switch 401 is an NMOSFET, the second switch 402 is PMOSFET, and the third switch 403 is NMOSFET, reference may be made to FIG. 6, which is a specific structural schematic diagram of the compensation circuit including three switches provided in an embodiment of the present application. As shown in FIG. 6, the first switch 401 may include a switch T1, the second switch 402 may include a switch T2, and the third switch 403 may include a switch T3, wherein T1 is NMOSFET, T2 is PMOSFET, and T3 is NMOSFET.

Here, only connections among switches T1, T2, and T3 in the circuit are described, and the connections among other remaining circuits will not be repeated.

A gate (i.e., control end) of switch T1 is in connection with the feedback voltage end of the display panel 10, a drain (i.e., input end) of switch T1 is in connection with the second output end of the power management circuit 20, and a source (i.e., output end) of switch T1 is connected to the power supply end of the operational amplifier circuit 30.

A gate (i.e., control end) of switch T2 is in connection with the feedback voltage end of the display panel 10, a source (i.e., input end) of switch T2 is in connection with the first output end of the power management circuit 20, and a drain (i.e., output end) of switch T2 is connected to the first input end of the operational amplifier circuit 30.

A gate (i.e., control end) of switch T3 is in connection with a feedback voltage end of the display panel 10, a drain (i.e., input end) of switch T3 is in connection with the first output end of the power management circuit 20, and a source (i.e., output end) of switch T3 is connected to the common voltage VCOM end of the display panel 10.

The working principle of the compensation circuit provided in FIG. 6 is explained below in conjunction with FIG. 6.

When the display panel 10 has a non-target display problem, if it is analyzed by the waveform analysis circuit that the feedback voltage VCOM_FB is smaller than the target threshold, then it is indicated that the current display panel 10 has a first type of non-target display problem, and the VCOM compensation is not required to achieve the purpose of reducing power consumption.

Particularly, because the switch T2 is a PMOSFET, which has the characteristics of low-level conduction and high-level cutoff, so when the feedback voltage VCOM_FB is the first target feedback voltage, the first target feedback voltage can control the switch T2 to be switched on, and the channel of common voltage VCOM between the power management circuit 20 and the display panel 10 is switched on (that is, the second channel Ch2 is selected to be switched on), and the power management circuit 20 provides the common voltage VCOM to the display panel 10.

Because the switch T1 and switch T3 are both NMOSFET, which have the characteristics of high-level conduction and low-level cutoff, so when the feedback voltage VCOM_FB is the first target feedback voltage, the first target feedback voltage can control the switch T1 and switch T3 to be switched off (i.e., the first channel Ch1 and the third channel Ch3 are switched off). At this time, the operational amplifier circuit 30 cannot receive the operating voltage AVDD output from the switch circuit 40, and the operational amplifier circuit 30 is switched to the stopped state. The operational amplifier circuit 30 stops receiving the common voltage VCOM output from the switch circuit 40 and the feedback voltage VCOM_FB (i.e., the first target feedback voltage) provided by the display panel 10. Since the operational amplifier circuit 30 is in an off-working state, the compensation multiple cannot be determined according to the ratio of the internal feedback resistor and the input resistor, and the compensation voltage VCOM_IN cannot be output to the display panel 10 according to the compensation multiple, and the VCOM compensation function is not on.

Herein, at least one of the feedback resistor and the input resistor is a variable resistor, to improve the flexibility of the compensation circuit during compensation.

When the display panel 10 has a non-target display problem, if it is analyzed by the waveform analysis circuit that the feedback voltage VCOM_FB is greater than or equal to the target threshold, then it is indicated that the current display panel 10 has a second type of non-target display problem, and the VCOM compensation is required to solve this type of display problem.

Particularly, according to the above description, when the feedback voltage VCOM_FB is the second target feedback voltage, the second target feedback voltage is unable to switch on the switch T2. At this time, the switch T2 is switched off, and the channel of common voltage VCOM between the power management circuit 20 and the display panel 10 is switched off (that is, the second channel Ch2 is switched off), and the power management circuit 20 does not provide the common voltage VCOM to the display panel 10.

According to the above description, when the feedback voltage VCOM_FB is the second target feedback voltage, the second target feedback voltage enables both the switch T1 and switch T3 to be switched on (i.e., the first channel Ch1 and the third channel Ch3 are selected to be switched on). The operational amplifier circuit 30 is enabled to receive the operating voltage AVDD output from the switch circuit 40, the operational amplifier circuit 30 is switched to the working state, the operational amplifier circuit 30 is enabled to receive the common voltage VCOM output from the switch circuit 40 and the feedback voltage VCOM_FB (i.e., the second target feedback voltage) provided by the display panel 10, and determine the compensation multiple according to the ratio of the internal feedback resistor and the input resistor, and then output the compensation voltage VCOM_IN to the display panel 10 according to the compensation multiple, to compensate the common voltage in the display panel 10, so as to solve the display problem of the display panel 10.

In the embodiments of the present application, the compensation circuit, on the one hand, can further determine, according to the magnitude relationship between the feedback voltage and the target threshold, whether the display problem of a relatively mild degree occurring in the current display panel needs to be further improved by the common-voltage compensation method when the PDF signal is at a low level, thereby the accuracy of compensation of the compensation circuit when the PDF signal is at a low level can be improved and the power consumption of the compensation circuit can be reduced. On the other hand, the power management circuit can be independently controlled to no longer input the common voltage VCOM to the first input end of the operational amplifier circuit when the VCOM compensation is not performed, thereby the power consumption of the compensation circuit can be further reduced.

To improve the integration of the compensation circuit and reduce the size of the compensation circuit, as another optional implementation, the switch circuit may include one selector and one switch, as shown in FIG. 7. It should be noted that the embodiments here are carried out when the PDF signal is at a low level.

FIG. 7 is a structural schematic diagram of a compensation circuit including one selector and one switch provided in an embodiment of the present application. As shown in FIG. 7, the compensation circuit includes: a power management circuit 20, an operational amplifier circuit 30 and a switch circuit 40. Herein, the switch circuit 40 includes a first switch 401 and a first selector 404.

Particularly, a first voltage end of the first selector 404 is in connection with the feedback voltage end of the display panel 10, and configured to receive the feedback voltage VCOM_FB output from the display panel 10. A second voltage end of the first selector 404 is in connection with a third output end of the power management circuit 20, and configured to receive the first reference voltage $V_0$ output from the power management circuit 20. A third voltage end of the first selector 404 is in connection with the first output end of the power management circuit 20, and configured to receive the common voltage VCOM output from the power management circuit 20. A second output end of the first selector 404 is connected to the first input end of the operational amplifier circuit 30, and configured to output the common voltage VCOM to the operational amplifier circuit 30. A first output end of the first selector 404 is connected to the common voltage end of the display panel 10, and configured to output the common voltage VCOM to the display panel 10.

The second output end of the power management circuit 20 is connected to an input end of the first switch 401, and is configured to output the operating voltage AVDD to the first switch 401. An output end of the first switch 401 is connected to the power supply end of the operational amplifier circuit 30, and is configured to output the operating voltage AVDD to the operational amplifier circuit 30. A control end of the first switch 401 is in connection with the feedback voltage end of the display panel 10, and is configured to receive the feedback voltage VCOM_FB output from the display panel 10.

The second input end of the operational amplifier circuit 30 is in connection with the feedback voltage end of the display panel 10, and is configured to receive the feedback voltage VCOM_FB output from the display panel 10. The output end of the operational amplifier circuit 30 is connected to the compensation voltage end of the display panel 10, and is configured to output the compensation voltage VCOM_IN to the display panel 10.

By comparing the magnitude relationship between the feedback voltage VCOM_FB and the target threshold, different channels of the first selector 404 can be switched on. The channel of common voltage VCOM between the power management circuit 20 and the operational amplifier circuit 30 is referred to as the first channel Ch1, and the channel of common voltage VCOM between the power management circuit 20 and the display panel 10 is referred to as the second channel Ch2.

The third channel Ch3 is the channel of operating voltage AVDD between the power management circuit 20 and the operational amplifier circuit 30, which is controlled by the first switch 401.

Herein, according to the characteristics of the aforementioned PMOSFET and NMOSFET, and the requirements of the circuit, the first switch 401 in FIG. 7 being an NMOSFET is taken as an example for exemplary description. At this time, the first threshold voltage is smaller than the second target feedback voltage, and the first threshold voltage is greater than the first target feedback voltage. When the first target feedback voltage is received, the first switch 401 is switched off, and when the second target feedback voltage is received, the first switch 401 is switched on.

When the first switch 401 is the NMOSFET, the gate (i.e., control end) of the first switch 401 is in connection with the feedback voltage end of the display panel 10, the drain (i.e., input end) of the first switch 401 is in connection with the second output end of the power management circuit 20, and the source (i.e., output end) of the first switch 401 is connected to the power supply end of the operational amplifier circuit 30.

Herein, the first selector 404 may include a comparator and a gate-controlled switch, and reference may be made to FIG. 8, which is a specific structural schematic diagram of a first selector provided in an embodiment of the present application. As shown in FIG. 8, the first selector 404 includes that:

The first voltage end is respectively in connection with an inverting input end of the first comparator $A_1$ (i.e., the "−" end of $A_1$) and a non-inverting input end of the second comparator $A_2$ (i.e., the "+" end of $A_2$). The second voltage end is respectively in connection with a non-inverting input end of the first comparator $A_1$ (i.e., the "+" end of $A_1$) and an inverting input end of the second comparator $A_2$ (i.e., the "−" end of $A_2$). The first voltage end is configured to receive the feedback voltage VCOM_FB output from the display panel 10. The second voltage end is configured to receive the first reference voltage $V_0$ output from the power management circuit 20.

An output end of the first comparator $A_1$ is connected to a control end of a first gate-controlled switch $K_1$. An output end of the second comparator $A_2$ is connected to a control end of a second gate-controlled switch $K_2$. An input end of the first gate-controlled switch $K_1$ and an input end of the second gate-controlled switch $K_2$ are connected in common at point b, and the third voltage end $F_3$ is connected at point b.

An output end of the first gate-controlled switch $K_1$ is the first output end $F_1$ of the first selector 404, and an output end of the second gate-controlled switch $K_2$ is the second output end $F_2$ of the first selector 404.

Herein, to save costs, the first comparator $A_1$ and the second comparator $A_2$ in the embodiments of the present application may be implemented as an operational amplifier. In other optional embodiments, the first comparator $A_1$ and the second comparator $A_2$ may also be specific circuits, etc.

The first gate-controlled switch $K_1$ and the second gate-controlled switch $K_2$ may be MOS transistors, BJT tubes, or electronic switches such as relays. The embodiments of the present application do not have particularly limitation on this, and an exemplary illustration is given.

The circuit of first selector 404 in FIG. 8 is specifically applied to the compensation circuit, and references may be made to FIG. 9, which is a specific structural schematic diagram of the compensation circuit including one selector and one switch provided in an embodiment of the present application. In here only the connection relationship when the first selector 404 is applied to the compensation circuit is introduced, and the connection relationship of the remaining circuits is not detailed here.

As shown in FIG. 9, the first voltage end is in connection with the feedback voltage end of the display panel 10, the second voltage end is in connection with the third output end of the power management circuit 20, the first output end $F_1$ is connected to the common voltage VCOM end of the display panel 10, the second output end $F_2$ is connected to the first input end of the operational amplifier circuit 30, and the third voltage end $F_3$ is in connection with the first output end of the power management circuit 20.

Herein, the second voltage end may not be connected with the third output end of the power management circuit 20, and may be directly connected with a power supply voltage (not shown) alone, so as to reduce the loss of the power management circuit 20.

The feedback voltage end of the display panel 10 is configured to output a feedback voltage VCOM_FB. The feedback voltage VCOM_FB is a first target feedback voltage when the non-target display problem of the display panel 10 is a first type of non-target display problem. The feedback voltage VCOM_FB is a second target feedback voltage when the non-target display problem of the display panel 10 is a second type of non-target display problem. The voltage value of first reference voltage $V_0$ may be an average of the first target feedback voltage and the second target feedback voltage, or other values. The first reference voltage $V_0$ is greater than the first target feedback voltage and smaller than the second target feedback voltage.

The working principle of the compensation circuit provided in FIG. 9 is described below in conjunction with FIG. 9.

When the display panel 10 has a non-target display problem, if it is analyzed by the waveform analysis circuit that the feedback voltage VCOM_FB is smaller than the target threshold, then it is indicated that the current display panel 10 has a first type of non-target display problem, and the VCOM compensation is not required to achieve the purpose of reducing power consumption.

Particularly, because the first switch 401 is an NMOSFET, which has the characteristics of high-level conduction and low-level cutoff, so when the first target feedback voltage is received, the first switch 401 is switched off, the channel of operating voltage AVDD between the power management circuit 20 and the operational amplifier circuit 30 is switched off (that is, the third channel Ch3 is switched off), and the switch circuit 40 stops outputting the operating voltage AVDD to the operational amplifier circuit 30.

In the case that the first target feedback voltage is received by the first selector 404, where the first target feedback voltage is smaller than the first reference voltage $V_0$, the first comparator $A_1$ output is positive, the first gate-controlled switch $K_1$ is switched off, the channel of common voltage VCOM between the power management circuit 20 and the display panel 10 is selected and switched on (that is, the second channel Ch2 is switched on), and the switch circuit 40 outputs the common voltage VCOM to the display panel 10. The second comparator $A_2$ output is negative, and the second gate-controlled switch $K_2$ is switched off, and then the channel of common voltage VCOM between the power management circuit 20 and the operational amplifier circuit 30 is switched off (that is, the first channel Ch1 is switched off), and the switch circuit 40 stops outputting the common voltage VCOM to the operational amplifier circuit 30.

In the case that the feedback voltage VCOM_FB is the first target feedback voltage, it can be seen from the previous description that because the switch circuit 40 stops outputting the operating voltage AVDD to the operational amplifier circuit 30, the operational amplifier circuit 30 is switched to a stopped state, stops receiving the feedback voltage VCOM_FB (i.e., the first target feedback voltage) output from the display panel 10, stops calculating the compensation multiple according to the input resistance and the compensation resistance as well as outputting the compensation voltage VCOM_IN to the display panel 10 according to the compensation multiple.

When the display panel 10 has a non-target display problem, and if it is analyzed by the waveform analysis circuit that the feedback voltage VCOM_FB is greater than or equal to the target threshold, then it is indicated that the current display panel 10 has a second type of non-target display problem, and VCOM compensation is required to solve this type of display problem.

Particularly, according to the previous description, it can be known that when the second target feedback voltage is received, the first switch 401 is switched on, the channel of operating voltage AVDD between the power management circuit 20 and the operational amplifier circuit 30 is switched on (i.e., the third channel Ch3 is switched on), and the switch circuit 40 outputs the operating voltage AVDD to the operational amplifier circuit 30.

According to the previous description, in the case that the second target feedback voltage is received by the first selector 404, where the second target feedback voltage is greater than the first reference voltage $V_0$, the output of the second comparator $A_2$ is positive, and the second gate-controlled switch $K_2$ is switched on. At this time, the channel of common voltage VCOM between the power management circuit 20 and the operational amplifier circuit 30 is selected and switched on (that is, the first channel Ch1 is switched on), and the switch circuit 40 outputs the common voltage VCOM to the operational amplifier circuit 30. The output of the first comparator $A_1$ is negative, the first gate-controlled switch $K_1$ is switched off, the channel of common voltage VCOM between the power management circuit 20 and the display panel 10 is switched off (that is, the second channel Ch2 is switched off), and the switch circuit 40 stops outputting the common voltage VCOM to the display panel 10.

In the case that the feedback voltage VCOM_FB is the second target feedback voltage, it can be seen from the previous description that because the switch circuit 40 starts to output the operating voltage AVDD to the operational amplifier circuit 30, the operational amplifier circuit 30 is switched to the working state, and the operational amplifier circuit 30 is configured to receive the common voltage VCOM output from the switch circuit 40 and the feedback voltage VCOM_FB (i.e., the first target feedback voltage) provided by the display panel 10, and determine the compensation multiple according to the ratio of the internal feedback resistor and the input resistor, and then output the compensation voltage VCOM_IN to the display panel 10 according to the compensation multiple, to compensate the common voltage in the display panel 10, so as to solve the display problem of the display panel 10.

In the embodiments of the present application, the compensation circuit using one selector to replace the second switch and the third switch, which on the one hand, can save costs compared to the compensation circuit in which the switch circuit includes three switches; on the other hand, when the PDF signal is at a low level, the compensation circuit can be further determine, based on the relationship between the feedback voltage and the target threshold, whether the display problem of a relatively mild degree occurring in the current display panel needs to be further improved by the common-voltage compensation method. When the problem needs to be improved by the common-voltage compensation method, the compensation voltage is output from the compensation circuit to the display panel; and when the problem does not need to be improved by the common-voltage compensation method, the common voltage is output from the compensation circuit to the display panel, thereby the accuracy of compensation of the compensation circuit when the PDF signal is at a low level can be improved and the power consumption of the compensation circuit can be reduced.

To improve the accuracy of compensation of compensation circuit, as another optional implementation, the switch circuit may include two selectors and one switch, as shown in FIG. 10.

It should be noted that the display panel 10 may have multiple common voltage ends, such as a first common voltage end, a second common voltage end, etc., which are respectively configured to receive a first common voltage VCOM_1, a second common voltage VCOM_2, etc. In this case, the switch circuit 40 has multiple output ends, which are respectively connected to the multiple common voltage ends of the display panel 10. The display panel 10, when provided with multiple common voltage ends, can not only increase the switching rate of the display panel 10 but also reduce the occurrence of horizontal crosstalk display problems.

The display panel 10 may also include multiple feedback voltage ends, such as a first feedback voltage end, a second feedback voltage end, etc., which are respectively configured to output a first feedback voltage VCOM_FB1, a second feedback voltage VCOM_FB2, etc. The display panel 10 may also include multiple compensation voltage ends, such as a first compensation voltage end, a second compensation voltage end, etc., which are respectively configured to receive a first compensation voltage VCOM_IN1, a second compensation voltage VCOM_IN2, etc. The display panel 10 may also include a PDF end configured to receive a PDF signal.

Only two selectors are shown in FIG. 10 as an exemplary illustration. It can be understood that two or more selectors may be included in actual applications.

FIG. 10 is a structural schematic diagram of a compensation circuit including two selectors and one switch provided in an embodiment of the present application. As shown in FIG. 10, the compensation circuit includes: a power management circuit 20, an operational amplifier circuit 30, a switch circuit 40 and a timing controller 50. Herein, the switch circuit 40 includes a first selector 404, a second selector 405 and a first switch 401, and the operational amplifier circuit 30 includes a plurality of operational amplifiers.

Particularly, the output end of the timing controller 50 is respectively connected to the PDF end of the display panel 10, a first voltage end of the first selector 404 and a control end of the first switch 401. The timing controller 50 is configured to detect the severity of the display problem of the display panel 10, and output the PDF signal to the display panel 10, the first selector 404 and the first switch 401. For example, in the case of a general display problem of the display panel 10, a low level of PDF signal is output; and in the case of a special display problem of the display panel 10, a high level of PDF signal is output.

A second voltage end of the first selector 404 is in connection with the third output end of the power management circuit 20, and configured to receive the first reference voltage $V_0$ output from the power management circuit 20. A third voltage end of the first selector 404 is in connection with the first output end of the power management circuit 20, and configured to receive the common voltage VCOM output from the power management circuit 20.

A first output end of the first selector 404 is respectively connected to the first input end of the operational amplifier circuit 30 and a third voltage end of the second selector 405, and configured to provide the second common voltage VCOM_2 to the operational amplifier circuit 30 and output the first common voltage VCOM_1 to the second selector 405. A second output end of the first selector 404 is connected to a second common voltage end of the display panel 10, and configured to provide the second common voltage VCOM_2 to the display panel 10.

A first voltage end of the second selector 405 is in connection with a first feedback voltage end of the display panel 10, and configured to receive the first feedback voltage VCOM_FB1 output from the display panel 10. A second voltage end of the second selector 405 is in connection with a fourth output end of the power management circuit 20, and configured to receive the second reference voltage $V_1$ output from the power management circuit 20.

A second output end of the second selector 405 is respectively connected to a first compensation voltage end of the display panel 10 and the first output end of the operational amplifier circuit 30, and configured to output the first compensation voltage VCOM_IN1 to the display panel 10 in case that the first feedback voltage VCOM_FB1 is greater than or equal to the target threshold. A first output end of the second selector 405 is connected to a first common voltage end of the display panel 10, and configured to output the first common voltage VCOM_1 to the display panel 10 in case that the first feedback voltage VCOM_FB1 is smaller than the target threshold.

A first group of inverting input ends of the operational amplifier circuit 30 is in connection with the first feedback voltage end of the display panel 10, and configured to receive the first feedback voltage VCOM_FB1 output from the display panel 10. A second group of inverting input ends of the operational amplifier circuit 30 is in connection with the second feedback voltage end of the display panel 10, and configured to receive the second feedback voltage VCOM_FB2 output from the display panel 10. The second output end of the operational amplifier circuit 30 is connected to a second compensation voltage end of the display panel 10, and configured to output the second compensation voltage VCOM_IN2 to the display panel 10.

An input end of the first switch 401 is in connection with the second output end of the power management circuit 20, and configured to receive the operating voltage AVDD output from the power management circuit 20. Am output end of the first switch 401 is connected to the power supply end of the operational amplifier circuit 30, and configured to output the operating voltage AVDD to the operational amplifier circuit 30.

Herein, according to the characteristics of the aforementioned PMOSFET and NMOSFET, and the requirements of the circuit, the first switch 401 in FIG. 10 being a PMOSFET is taken as an example for exemplary description. In this case, the first threshold voltage is smaller than the high-level voltage of the PDF signal, and the first threshold voltage is greater than the low-level voltage of the PDF signal. When the PDF signal is a high-level voltage, the first switch 401 is switched off, and when the PDF signal is a low-level voltage, the first switch 401 is switched on.

In the case that the first switch 401 is a PMOSFET, the gate (i.e., control end) of the first switch 401 is in connection with the output end of the timing controller 50, the source (i.e., input end) of the first switch 401 is in connection with the second output end of the power management circuit 20, and the drain (i.e., output end) of the first switch 401 is connected to the power supply end of the operational amplifier circuit 30.

Herein, the specific structure of the second selector 405 may be consistent with that of the first selector 404, as shown in FIG. 11, which will not be repeated here, and the structure of the second selector 405 may be inconsistent with the structure of the first selector 404. The second selector 405 may be other selection circuit or selection chips, etc., and the embodiments of the present application have no particularly limitations on this. As shown FIG. 11, the specific structure of the second selector 405 is consistent with that of the first selector 404, which is only taken as an example for exemplary description.

FIG. 11 is a specific structural schematic diagram of the compensation circuit including two selectors and one switch provided in an embodiment of the present application. As shown in FIG. 11, only connection relationships of the first selector 404 and the second selector 405 in the circuit is described here, and the connection relationships of the remaining circuits are not detailed here.

As shown in FIG. 11, the first voltage end of the first selector 404 is in connection with the output end of the timing controller 50 and configured to receive the PDF signal. The second voltage end of the first selector 404 is in connection with the third output end of the power management circuit 20 and configured to receive the first reference voltage $V_0$ output from the power management circuit 20. The third voltage end $F_3$ of the first selector 404 is in connection with the first output end of the power management circuit 20 and configured to receive the common voltage VCOM output from the power management circuit 20.

The first output end $F_1$ of the first selector 404 is respectively connected to the first input end of the operational amplifier circuit 30 and the third voltage end of the second selector 405, and configured to provide the second common voltage VCOM_2 to the operational amplifier circuit 30 and output the first common voltage VCOM_1 to the second selector 405. The second output end $F_2$ of the first selector 404 is connected to the second common voltage end of the display panel 10 and configured to provide the second common voltage VCOM_2 to the display panel 10.

The first voltage end of the second selector 405 is in connection with the first feedback voltage end of the display panel 10, and configured to receive the first feedback voltage VCOM_FB1 output from the display panel 10. The second voltage end of the second selector 405 is in connection with the fourth output end of the power management circuit 20, and configured to receive the second reference voltage $V_1$ output from the power management circuit 20. The third voltage end $F_6$ of the second selector 405 is in connection with the first output end $F_1$ of the first selector 404, and configured to receive the first common voltage VCOM_1 output from the first selector 404.

The first output end $F_4$ of the second selector 405 is connected to the first common voltage end of the display panel 10, and configured to output the first common voltage VCOM_1 to the display panel 10 in case that the first feedback voltage VCOM_FB1 is smaller than the target threshold. The second output end $F_5$ of the second selector 405 is respectively connected to the first compensation voltage end of the display panel 10 and the first output end of the operational amplifier circuit 30, and configured to output the first compensation voltage VCOM_IN1 to the display panel 10 in case that the first feedback voltage VCOM_FB1 is greater than or equal to the target threshold.

Herein, the first common voltage VCOM_1 and the second common voltage VCOM_2 are essentially common voltages VCOM. For the convenience of description, they are distinguished by wording "first" and "second", so the voltage value of the first common voltage VCOM_1 is equal to the voltage value of the second common voltage VCOM_2, and both of the voltage values of the first and second common voltages are equal to the voltage value of the common voltage VCOM. It can be understood that in practical applications, the three voltages may not be completely equal due to voltage instability and loss of circuit elements. The incomplete equality of the three voltages does not affect the operation of the compensation circuit.

In addition, a waveform detection circuit (not shown) is externally connected to a branch between the first feedback voltage VCOM_FB1 end of the display panel 10 and the first voltage end of the second selector 405. The waveform detection circuit is configured to detect the magnitude of the first feedback voltage VCOM_FB1 and determine the magnitude relationship between the first feedback voltage VCOM_FB1 and the target threshold. To reduce the complexity of the circuit, it may be selected that the first feedback voltage VCOM_FB1 end of the display panel 10 directly connected to the first voltage end of the second selector 405.

In case that the first feedback voltage VCOM_FB1 is smaller than the target threshold, indicating that the non-target display problem of the display panel 10 is a first type of non-target display problem, then the VCOM compensation method is not required. In case that the first feedback voltage VCOM_FB1 is greater than or equal to the target threshold, indicating that the non-target display problem of the display panel 10 is a second type of non-target display problem, then the VCOM compensation method is required to improve the display problem. For the convenience of description, in the following, the first feedback voltage VCOM_FB1 smaller than the target threshold is referred to as a third target feedback voltage, and the first feedback voltage VCOM_FB1 greater than or equal to the target threshold is referred to as a fourth target feedback voltage.

Herein, a voltage generated by the PDF signal is referred to as voltage $V_p$. When it is detected by the timing controller 50 that the display panel 10 has a special display problem, the PDF signal is on and the voltage $V_p$ of the PDF signal is a high-level voltage. When it is detected by the timing controller 50 that the display panel 10 has a general display problem, the PDF signal is off, and the voltage $V_p$ of the PDF signal is a low-level voltage. The voltage value of the first reference voltage $V_0$ is greater than the low-level voltage of the voltage $V_p$ and smaller than the high-level voltage of the voltage $V_p$.

The voltage value of the second reference voltage $V_1$ may be an average of the third target feedback voltage and the fourth target feedback voltage, or can be other values. The second reference voltage $V_1$ is greater than the third target feedback voltage and smaller than the fourth target feedback voltage.

The working principle of the compensation circuit provided in FIG. 11 is described below in conjunction with FIG. 11.

When it is detected by the timing controller 50 that the display problem of the display panel 10 is a general display problem, the PDF signal in the timing controller 50 is at a low level, and the low level of PDF signal is input to the display panel 10, the first selector 404 and the first switch 401. At this time, it indicated that the display problem is a general display problem, and the display problem can be solved by only performing the VCOM compensation.

Particularly, when the PDF signal is a low-level signal, the first switch 401 is switched on, the voltage $V_p$ is smaller than the first reference voltage $V_0$, the output of the first comparator $A_1$ is positive, the first gate-controlled switch $K_1$ is switched on, a channel of second common voltage VCOM_2 between the power management circuit 20 and the operational amplifier circuit 30 is switched on, and a channel of first common voltage VCOM_1 between the power management circuit 20 and the second selector 405 is switched on, so the first selector 404 is enabled to output the second common voltage VCOM_2 to the operational amplifier circuit 30 and output the first common voltage VCOM_1 to the second selector 405. The output of the second comparator $A_2$ is negative, the second gate-controlled switch $K_2$ is switched off, and the channel of second common voltage VCOM_2 between the power management circuit 20 and the display panel is switched off, so the first selector 404 stops outputting the second common voltage VCOM_2 to the display panel 10.

Because the first switch 401 is a PMOSFET, which has the characteristics of low-level conduction and high-level cut-off, the low level of PDF signal may enable the first switch 401 to be switched on, and the operating voltage AVDD via the first switch 401 is output to the operational amplifier circuit 30. The operational amplifier circuit 30 upon receiving the operating voltage AVDD provided by the power management circuit 20, is switched to the working state. And because the second common voltage VCOM_2 is output via the first selector 404 to the operational amplifier circuit 30, so the operational amplifier circuit 30 in the working state is enabled to receive the second common voltage VCOM_2 provided by the power management circuit 20 and the first feedback voltage VCOM_FB1 and the second feedback voltage VCOM_FB2 provided by the display panel 10.

Each operational amplifier in the operational amplifier circuit 30 that can receive the second feedback voltage VCOM_FB2 is configured to determine the compensation multiple according to the ratio of the internal feedback resistor and the input resistor, and then output the second compensation voltage VCOM_IN2 to the display panel 10 according to the compensation multiple, to compensate for part of the common voltage in the display panel 10, so as to solve the display problem of the display panel 10.

Each operational amplifier in the operational amplifier circuit 30 that can receive the first feedback voltage VCOM_FB1 is configured to determine the compensation multiple according to the ratio of the internal feedback resistor and the input resistor, and then output the first compensation voltage VCOM_IN1 to the second selector 405 according to the compensation multiple.

The second selector 405 is configured, by determining the magnitude relationship between the first feedback voltage VCOM_FB1 and the target threshold, to selectively output different voltages (i.e., output the first compensation voltage VCOM_IN1 or the first common voltage VCOM_1) to the display panel 10.

Particularly, in case that the first feedback voltage VCOM_FB1 is smaller than the target threshold, indicating that the pixels in the region connected to the first feedback voltage VCOM_FB1 end of the display panel 10 are driven normally, the display screen in this region is normal, and this region does not need the VCOM compensation. At this time, the first feedback voltage VCOM_FB1 received by the second selector 405 is the third target feedback voltage. The third target feedback voltage is smaller than the second reference voltage $V_1$, the output of the third comparator $A_3$ is positive, the third gate-controlled switch $K_3$ is switched on, the channel of first common voltage VCOM_1 between the power management circuit 20 and the display panel 10 is switched on, so the second selector 405 outputs the first common voltage VCOM_1 to the display panel 10. The output of the fourth comparator $A_4$ is negative, the fourth gate-controlled switch $K_4$ is switched off, and the channel of first compensation voltage VCOM_IN1 between the operational amplifier circuit 30 and the display panel 10 is switched off, so the second selector 405 stops outputting the first common voltage VCOM_1 to the display panel 10.

In case that the first feedback voltage VCOM_FB1 is greater than or equal to the target threshold, indicating that the pixels in the region connected to the first feedback voltage VCOM_FB1 end of the display panel 10 are abnormally driven, causing problems in the display screen of this region, and the VCOM compensation is required for this region. At this time, the first feedback voltage VCOM_FB1 received by the second selector 405 is the fourth target feedback voltage. The fourth target feedback voltage is greater than the second reference voltage $V_1$, the output of the fourth comparator $A_4$ is positive, the fourth gate-controlled switch $K_4$ is switched on, the channel of first compensation voltage VCOM_IN1 between the operational amplifier circuit 30 and the display panel 10 is switched on, so the second selector 405 outputs the first compensation voltage VCOM_IN1 to the display panel 10. The output of the third comparator $A_3$ is negative, the third gate-controlled switch $K_3$ is switched off, the channel of first common voltage VCOM_1 between the power management circuit 20 and the display panel 10 is switched off, so the second selector 405 stops outputting the first common voltage VCOM_1 to the display panel 10.

When it is detected by the timing controller 50 that the display problem of the display panel 10 is a special display problem, the PDF signal in the timing controller 50 is at a high level, and the high level of PDF signal is input to the display panel 10, the first selector 404 and the first switch 401. In this case, it is indicated that the display problem is a special display problem, and the display problem can only be solved by changing the driving mode of the liquid crystal in the display panel 10.

Particularly, according to the above description, when the PDF signal is at a high level, the first switch 401 is switched off, the voltage $V_p$ is greater than the first reference voltage $V_0$, the output of the second comparator $A_2$ is positive, the second gate-controlled switch $K_2$ is switched on, and the channel of second common voltage VCOM_2 between the power management circuit 20 and the display panel 10 is switched on, so the first selector 404 outputs the second common voltage VCOM_2 to the display panel 10. The output of the first comparator $A_1$ is negative, the first gate-controlled switch $K_1$ is switched off, the channel of second common voltage VCOM_2 between the power management circuit 20 and the operational amplifier circuit 30 is switched off, and the channel of first common voltage VCOM_1 between the power management circuit 20 and the second selector 405 is switched off, so the first selector 404 stops outputting the second common voltage VCOM_2 to the operational amplifier circuit 30 and stops outputting the first common voltage VCOM_1 to the second selector 405.

According to the above content, it can be known that the high level of PDF signal can control the first switch 401 to be switched off, and the first switch 401 stops outputting the operating voltage AVDD to the operational amplifier circuit 30, so the operational amplifier circuit 30 cannot receive the operating voltage AVDD provided by the power management circuit 20, and the operational amplifier circuit 30 is switched to the stopped state. Also, because the first selector 404 stops outputting the second common voltage VCOM_2 to the operational amplifier circuit 30, the operational amplifier circuit 30 also does not receive the second feedback voltage VCOM_FB1 provided by the display panel 10. Since the operational amplifier circuit 30 is in the off-working state, the compensation multiple cannot be determined according to the ratio of the internal feedback resistor and the input resistor, and the second compensation voltage VCOM_IN2 cannot be output to the display panel 10 according to the compensation multiple. The VCOM compensation function of the region connected to the second feedback voltage VCOM_FB2 in the display panel 10 is not provided.

The second selector 405 stops working because the first common voltage VCOM_1 and the first feedback voltage VCOM_FB1 are not received, and all channels are switched off.

In the embodiments of the present application, the compensation circuit, by adding a second selector, can further determine whether VCOM compensation is required based on regions according to the relationship between the feedback voltage and the target threshold value when the PDF signal is at a low level, thereby the accuracy of compensation of the compensation circuit when the PDF signal is at a low level can be improved and the power consumption of the compensation circuit can be reduced.

Provided in the embodiments of the present application is also a display device. The display device includes a display panel and a compensation circuit in any of the above embodiments. The display panel is configured to display a screen and output a feedback voltage to the compensation circuit, and receive the PDF signal, the compensation voltage and the common voltage output from the compensation circuit.

Herein, the display panel may be a liquid crystal display (LCD), an organic light-emitting diode (OLED), a twisted nematic panel (TN), a VA panel, etc., which is not particularly limited in the embodiments of the present application.

In the description of the present application, it should be understood that the terms "first" and "second" are only used for descriptive purposes, and cannot be understood as indicating or implying relative importance or implicitly indicating the number of technical features indicated. Thus, a feature defined as "first" and "second" may explicitly or implicitly include the number of that feature is at least one.

It should be understood that when used in the specification and the appended claims of the present application, the term "include" indicates the presence of the described features, wholes, steps, operations, elements and/or components, but does not exclude the presence or addition of one or more other features, wholes, steps, operations, elements, components and/or collections thereof.

In addition, in this application, unless otherwise clearly specified and defined, the terms "connection", "connected" and the like should be understood in a broad sense, for example, it may be a mechanical connection or an electrical connection; it may be a direct connection or an indirect connection through an intermediate medium, it may be an internal connection of two elements or an interaction relationship between two elements, unless otherwise clearly defined, for persons of ordinary skill in the art, the specific meanings of the above terms in this application can be understood according to the specific circumstances.

Reference to "one embodiment" or "some embodiments" described in the specification of the present application, etc., means that one or more embodiments of this application include the particular feature, structure or characteristic described in conjunction with that embodiment. As a result, the statements "in one embodiment", "in some embodiments", "in some other embodiments", "in some other embodiments", etc. that appear at different places of this specification do not necessarily all refer to the same embodiments, but means "one or more but not all embodiments" unless otherwise specifically emphasized.

Finally, it should be noted that: the above embodiments are only used to illustrate the technical solutions of the present application, and are not intended to limit the present application. Although the present application has been described in detail with reference to the foregoing embodiments, persons of ordinary skills in the art should understand that the technical solutions described in the foregoing embodiments may still be modified, or some or all of the technical features thereof may be equivalently replaced; and these modifications or replacements do not make the essence of the corresponding technical solutions deviate from the scope pf the technical solutions of the various embodiments of the present application.

What is claimed is:

1. A compensation circuit, comprising:

an operational amplifier circuit;

a switch circuit, connected to the operational amplifier circuit; and a power management circuit, connected to the switch circuit and configured to output a common voltage and an operating voltage to the switch circuit, wherein the switch circuit and the operational amplifier circuit are respectively configured to be connected to a display panel, and are respectively configured to receive a feedback voltage output from the display panel;

the switch circuit is configured, in case that the feedback voltage is greater than or equal to a target threshold, to output the common voltage and the operating voltage to the operational amplifier circuit and stop outputting the common voltage to the display panel; and the operational amplifier circuit is configured to receive the common voltage and the operating voltage output from the switch circuit and output a compensation voltage to the display panel; and the switch circuit is further configured, in case that the feedback voltage is smaller than the target threshold, to output the common voltage to the display panel and stop outputting the common voltage and the operating voltage to the operational amplifier circuit; and the operational amplifier circuit is further configured to stop receiving the feedback voltage output from the display panel and stop outputting the compensation voltage to the display panel, and wherein the compensation circuit further comprises a timing controller;

the timing controller is connected to the display panel and the switch circuit respectively, and configured to output a pattern defect function (PDF) signal to the display panel and the switch circuit respectively;

a priority of detecting the PDF signal by the switch circuit is higher than that of detecting the feedback voltage;

the switch circuit is further configured, when the display panel is controlled by the PDF signal to perform polarity inversion, to output the common voltage to the display panel and stop outputting the common voltage and the operating voltage to the operational amplifier circuit; and the operational amplifier circuit is configured to stop outputting the compensation voltage to the display panel and stop receiving the feedback voltage output from the display panel; and when the display panel is controlled by the PDF signal not to perform polarity inversion, the switch circuit is further configured, in case that the feedback voltage is greater than or equal to the target threshold, to output the common voltage and the operating voltage to the operational amplifier circuit and stop outputting the common voltage to the display panel; and the operational amplifier circuit is configured to receive the common voltage and the operating voltage output from the switch circuit, and output the compensation voltage to the display panel; and the switch circuit is further configured, in case that the feedback voltage is smaller than the target threshold, to output the common voltage to the display panel and stop outputting the common voltage and the operating voltage to the operational amplifier circuit; and the operational amplifier circuit is further configured to stop receiving the feedback voltage output from the display panel and stop outputting the compensation voltage to the display panel.

2. The compensation circuit according to claim 1, wherein the display panel is controlled by the PDF signal to perform polarity inversion comprises:

the timing controller is configured to detect a display problem of the display panel, and output a high level of PDF signal to the display panel and the switch circuit when the display panel has a target display problem, to control the display panel to perform polarity inversion; and the display panel is controlled by the PDF signal not to perform polarity inversion comprises:

the timing controller is configured to detect the display problem of the display panel, and output a low level of PDF signal to the display panel and the switch circuit when the display panel has a non-target display problem, and the display panel does not perform polarity inversion;

wherein the display problem comprises greenish or crosstalk of varying severity, and the target display problem is used to indicate the greenish or crosstalk of higher severity in the display problem.

3. The compensation circuit according to claim 2, wherein the switch circuit comprises a first selector, a second selector and a first switch;

a first voltage end of the first selector is in connection with an output end of the timing controller, a second voltage end of the first selector is in connection with a third output end of the power management circuit, the power management circuit is configured to output a reference voltage to the second voltage end of the first selector, a third voltage end of the first selector is in connection with a first output end of the power management circuit, and the power management circuit is configured to output the common voltage to the third voltage end of the first selector;

a first output end of the first selector is respectively connected to a first input end of the operational amplifier circuit and a third voltage end of the second selector, the first selector is configured to output a first common voltage to the third voltage end of the second selector, and the first selector is configured to output a second common voltage to the first input end of the operational amplifier circuit; a second output end of the first selector is connected to a second common voltage end of the display panel, and the first selector is configured to output the second common voltage to the display panel;

a first voltage end of the second selector is in connection with a first feedback voltage end of the display panel, a second voltage end of the second selector is in connection with a fourth output end of the power management circuit, and the power management circuit is configured to output the target threshold to the second voltage end of the second selector;

a first output end of the second selector is respectively connected to a first compensation voltage end of the display panel and a first output end of the operational amplifier circuit, and a second output end of the second selector is connected to a first common voltage end of the display panel;

a control end of the first switch is in connection with the output end of the timing controller, an input end of the first switch is in connection with a second output end of the power management circuit, and an output end of the first switch is connected to a power supply end of the operational amplifier circuit; and a first group of inverting input ends of a second input end of the operational amplifier circuit is in connection with the first feedback voltage end of the display panel; a second group of inverting input ends of the second input end of the operational amplifier circuit is in connection with a second feedback voltage end of the display panel; a second output end of the operational amplifier circuit is connected to a second compensation voltage end of the display panel.

4. The compensation circuit according to claim 3, wherein under a control of the high level of PDF signal, the first switch is switched off, and the first switch stops outputting the operating voltage to the operational amplifier circuit; the first selector is configured to output the common voltage to the display panel and stop outputting the common voltage to the operational amplifier circuit and the second selector; the second selector is disabled;

the operational amplifier circuit is configured to stop outputting a second compensation voltage to the display panel, stop receiving a first feedback voltage and a second feedback voltage output from the display panel, stop receiving the second common voltage output from the first selector, and stop outputting a first compensation voltage to the second selector; and under a control of the low level of PDF signal, the first switch is switched on, and the operating voltage via the first switch is output to the operational amplifier circuit; the first selector is configured to output the second common voltage to the operational amplifier circuit, output the first common voltage to the second selector, and stop outputting the second common voltage to the display panel; the operational amplifier circuit is configured to receive the second common voltage output from the first selector, receive the first feedback voltage and the second feedback voltage output from the display panel, output the second compensation voltage to the display panel, and output the first compensation voltage to the second selector; the second selector is configured to output the first compensation voltage or the first common voltage to the display panel according to a magnitude relationship between the first feedback voltage and the target threshold.

5. The compensation circuit according to claim 4, wherein the second selector is configured to output the first compensation voltage or the first common voltage to the display panel according to the magnitude relationship between the first feedback voltage and the target threshold, comprises:

the second selector is configured to output the first compensation voltage in case that the first feedback voltage is greater than or equal to the target threshold, and configured to output the first common voltage in case that the first feedback voltage is smaller than the target threshold.

6. The compensation circuit according to claim 1, wherein the switch circuit comprises a first switch, a second switch and a third switch;

a control end of the first switch, a control end of the second switch and a control end of the third switch are in connection with a feedback voltage end of the display panel respectively;

an input end of the first switch is in connection with a second output end of the power management circuit, and an output end of the first switch is connected to a power supply end of the operational amplifier circuit;

an input end of the second switch is in connection with a first output end of the power management circuit, and an output end of the second switch is connected to a common voltage end of the display panel;

an input end of the third switch is in connection with the first output end of the power management circuit, and an output end of the third switch is connected to a first input end of the operational amplifier circuit; and a second input end of the operational amplifier circuit is in connection with the feedback voltage end of the display panel, and an output end of the operational amplifier is connected to a compensation voltage end of the display panel;

wherein the switch circuit is configured, in case that the feedback voltage is greater than or equal to the target threshold, to output the common voltage and the operating voltage to the operational amplifier circuit and stop outputting the common voltage to the display panel, comprises:

in case that the feedback voltage is greater than or equal to the target threshold, the first switch and the third switch are controlled to be switched on and the second switch is controlled to be switched off via the feedback voltage; the operating voltage via the first switch is output to the operational amplifier circuit, the common voltage via the third switch is output to the operational amplifier circuit, and the second switch stops outputting the common voltage to the display panel; and wherein the switch circuit is further configured, in case that the feedback voltage is smaller than the target threshold, to output the common voltage to the display panel and stop outputting the common voltage and the operating voltage to the operational amplifier circuit, comprises:

in case that the feedback voltage is smaller than the target threshold, the first switch and the third switch are controlled to be switched off and the second switch is controlled to be switched on via the feedback voltage; the common voltage via the second switch is output to the display panel, the first switch stops outputting the operating voltage to the operational amplifier circuit, and the third switch stops outputting the common voltage to the operational amplifier circuit.

7. The compensation circuit according to claim 1, wherein the switch circuit comprises a first switch and a first selector;

a feedback voltage end of the display panel is respectively connected to a second input end of the operational amplifier circuit, a first voltage end of the first selector and a control end of the first switch;

a second voltage end of the first selector is in connection with a third output end of the power management circuit, a third voltage end of the first selector is in connection with a first output end of the power management circuit, a first output end of the first selector is connected to a first input end of the operational amplifier circuit, and a second output end of the first selector is connected to a common voltage end of the display panel;

an input end of the first switch is in connection with a second output end of the power management circuit, and an output end of the first switch is connected to a power supply end of the operational amplifier circuit; and an output end of the operational amplifier circuit is connected to a compensation voltage end of the display panel;

wherein the switch circuit is configured, in case that the feedback voltage is greater than or equal to the target threshold, to output the common voltage and the operating voltage to the operational amplifier circuit and stop outputting the common voltage to the display panel, comprises:

in case that the feedback voltage is greater than or equal to the target threshold, the first switch is controlled to switched on via the feedback voltage, a third channel is switched on, and the operating voltage via the first switch is output to the operational amplifier circuit; the first selector is controlled via the feedback voltage to select a first channel to be switched on, and the common voltage via the first selector is output to the operational amplifier circuit; the first selector is controlled via the feedback voltage to select a second channel to be switched off, and the first selector stops outputting the common voltage to the display panel; and wherein the switch circuit is further configured, in case that the feedback voltage is smaller than the target threshold, to output the common voltage to the display panel and stop outputting the common voltage and the operating voltage to the operational amplifier circuit, comprises:

in case that the feedback voltage is smaller than the target threshold, the first switch is controlled to be switched off via the feedback voltage, the third channel is switched off, and the first switch to stop outputting the operating voltage to the operational amplifier circuit; the first selector is controlled via the feedback voltage to select the first channel to be switched off, and the first selector stops outputting the common voltage to the operational amplifier circuit; and the first selector is controlled via the feedback voltage to select the second channel to be switched on, and the common voltage via the first selector is output to the display panel.

8. The compensation circuit according to claim 7, wherein the first channel is used to indicate a channel for power supplying of the common voltage between the power management circuit and the operational amplifier circuit; the second channel is used to indicate a channel for power supplying of the common voltage between the power management circuit and the display panel; and the third channel is used to indicate a channel for power supplying of the operating voltage between the power management circuit and the operational amplifier circuit.

9. A display device, comprising:

a display panel; and a compensation circuit, comprising:

an operational amplifier circuit;

a switch circuit, connected to the operational amplifier circuit; and a power management circuit, connected to the switch circuit and configured to output a common voltage and an operating voltage to the switch circuit, wherein the switch circuit and the operational amplifier circuit are respectively configured to be connected to the display panel, to receive a feedback voltage output from the display panel;

the switch circuit is configured, in case that the feedback voltage is greater than or equal to a target threshold, to output the common voltage and the operating voltage to the operational amplifier circuit and stop outputting the common voltage to the display panel; and the operational amplifier circuit is configured to receive the common voltage and the operating voltage output from the switch circuit and output a compensation voltage to the display panel; and the switch circuit is further configured, in case that the feedback voltage is smaller than the target threshold, to output the common voltage to the display panel and stop outputting the common voltage and the operating voltage to the operational amplifier circuit; and the operational amplifier circuit is further configured to stop receiving the feedback voltage output from the display panel and stop outputting the compensation voltage to the display panel, wherein the compensation circuit further comprises a timing controller;

the timing controller is connected to the display panel and the switch circuit respectively, and configured to output the PDF signal to the display panel and the switch circuit respectively;

a priority of detecting the PDF signal by the switch circuit is higher than that of detecting the feedback voltage;

the switch circuit is further configured, when the display panel is controlled by the PDF signal to perform polarity inversion, to output the common voltage to the display panel and stop outputting the common voltage and the operating voltage to the operational amplifier circuit; and the operational amplifier circuit is configured to stop outputting the compensation voltage to the display panel and stop receiving the feedback voltage output from the display panel; and when the display panel is controlled by the PDF signal not to perform polarity inversion, the switch circuit is further configured, in case that the feedback voltage is greater than or equal to the target threshold, to output the common voltage and the operating voltage to the operational amplifier circuit and stop outputting the common voltage to the display panel; and the operational amplifier circuit is configured to receive the common voltage and the operating voltage output from the switch circuit, and output the compensation voltage to the display panel; and the switch circuit is further configured, in case that the feedback voltage is smaller than the target threshold, to output the common voltage to the display panel and stop outputting the common voltage and the operating voltage to the operational amplifier circuit; and the operational amplifier circuit is further configured to stop receiving the feedback voltage output from the display panel and stop outputting the compensation voltage to the display panel, and wherein the display panel is configured to display a screen, output the feedback voltage to the compensation circuit, and receive a pattern defect function (PDF) signal, a compensation voltage and a common voltage output from the compensation circuit.

10. The display device according to claim 9, wherein the display panel is controlled by the PDF signal to perform polarity inversion comprises:

the timing controller is configured to detect a display problem of the display panel, and output a high level of PDF signal to the display panel and the switch circuit when the display panel has a target display problem, to control the display panel to perform polarity inversion; and the display panel is controlled by the PDF signal not to perform polarity inversion comprises:

the timing controller is configured to detect the display problem of the display panel, and output a low level of PDF signal to the display panel and the switch circuit when the display panel has a non-target display problem, and the display panel does not perform polarity inversion;

wherein the display problem comprises greenish or crosstalk of varying severity, and the target display problem is used to indicate the greenish or crosstalk of higher severity in the display problem.

11. The display device according to claim 10, wherein the switch circuit comprises a first selector, a second selector and a first switch;

a first voltage end of the first selector is in connection with an output end of the timing controller, a second voltage end of the first selector is in connection with a third output end of the power management circuit, the power management circuit is configured to output a reference voltage to the second voltage end of the first selector, a third voltage end of the first selector is in connection with a first output end of the power management circuit, and the power management circuit is configured to output the common voltage to the third voltage end of the first selector;

a first output end of the first selector is respectively connected to a first input end of the operational amplifier circuit and a third voltage end of the second selector, the first selector is configured to output a first common voltage to the third voltage end of the second selector, and the first selector is configured to output a second common voltage to the first input end of the operational amplifier circuit; a second output end of the first selector is connected to a second common voltage end of the display panel, and the first selector is configured to output the second common voltage to the display panel;

a first voltage end of the second selector is in connection with a first feedback voltage end of the display panel, a second voltage end of the second selector is in connection with a fourth output end of the power management circuit, and the power management circuit is configured to output the target threshold to the second voltage end of the second selector;

a first output end of the second selector is respectively connected to a first compensation voltage end of the display panel and a first output end of the operational amplifier circuit, and a second output end of the second selector is connected to a first common voltage end of the display panel;

a control end of the first switch is in connection with the output end of the timing controller, an input end of the first switch is in connection with a second output end of the power management circuit, and an output end of the first switch is connected to a power supply end of the operational amplifier circuit; and a first group of inverting input ends of a second input end of the operational amplifier circuit is in connection with the first feedback voltage end of the display panel; a second group of inverting input ends of the second input end of the operational amplifier circuit is in connection with a second feedback voltage end of the display panel; a second output end of the operational amplifier circuit is connected to a second compensation voltage end of the display panel.

12. The display device according to claim 11, wherein under a control of the high level of PDF signal, the first switch is switched off, and the first switch stops outputting the operating voltage to the operational amplifier circuit; the first selector is configured to output the common voltage to the display panel and stop outputting the common voltage to the operational amplifier circuit and the second selector; the second selector is disabled; the operational amplifier circuit is configured to stop outputting a second compensation voltage to the display panel, stop receiving a first feedback voltage and a second feedback voltage output from the display panel, stop receiving the second common voltage output from the first selector, and stop outputting a first compensation voltage to the second selector; and under a control of the low level of PDF signal, the first switch is switched on, and the operating voltage via the first switch is output to the operational amplifier circuit; the first selector is configured to output the second common voltage to the operational amplifier circuit, output the first common voltage to the second selector, and stop outputting the second common voltage to the display panel; the operational amplifier circuit is configured to receive the second common voltage output from the first selector, receive the first feedback voltage and the second feedback voltage output from the display panel, output the second compensation voltage to the display panel, and output the first compensation voltage to the second selector; the second selector is configured to output the first compensation voltage or the first common voltage to the display panel according to a magnitude relationship between the first feedback voltage and the target threshold.

13. The display device according to claim 12, wherein the second selector is configured to output the first compensation voltage or the first common voltage to the display panel according to the magnitude relationship between the first feedback voltage and the target threshold, comprises:

the second selector is configured to output the first compensation voltage in case that the first feedback voltage is greater than or equal to the target threshold, and output the first common voltage in case that the first feedback voltage is smaller than the target threshold.

14. The display device according to claim 9, wherein the switch circuit comprises a first switch, a second switch and a third switch;

a control end of the first switch, a control end of the second switch and a control end of the third switch are in connection with a feedback voltage end of the display panel respectively;

an input end of the first switch is in connection with a second output end of the power management circuit, and an output end of the first switch is connected to a power supply end of the operational amplifier circuit;

an input end of the second switch is in connection with a first output end of the power management circuit, and an output end of the second switch is connected to a common voltage end of the display panel;

an input end of the third switch is in connection with the first output end of the power management circuit, and an output end of the third switch is connected to a first input end of the operational amplifier circuit; and a second input end of the operational amplifier circuit is in connection with the feedback voltage end of the display panel, and an output end of the operational amplifier is connected to a compensation voltage end of the display panel;

wherein the switch circuit is configured, in case that the feedback voltage is greater than or equal to the target threshold, to output the common voltage and the operating voltage to the operational amplifier circuit and stop outputting the common voltage to the display panel, comprises:

in case that the feedback voltage is greater than or equal to the target threshold, the first switch and the third switch are controlled to be switched on and the second switch is controlled to be switched off via the feedback voltage; the operating voltage via the first switch is output to the operational amplifier circuit, the common voltage via the third switch is output to the operational amplifier circuit, and the second switch stops outputting the common voltage to the display panel; and wherein the switch circuit is further configured, in case that the feedback voltage is smaller than the target threshold, to output the common voltage to the display panel and stop outputting the common voltage and the operating voltage to the operational amplifier circuit, comprises:

in case that the feedback voltage is smaller than the target threshold, the first switch and the third switch are controlled to be switched off and the second switch is controlled to be switched on via the feedback voltage; the common voltage via the second switch is output to the display panel, the first switch stops outputting the operating voltage to the operational amplifier circuit, and the third switch stops outputting the common voltage to the operational amplifier circuit.

15. The display device according to claim 9, wherein the switch circuit comprises a first switch and a first selector;

a feedback voltage end of the display panel is respectively connected to a second input end of the operational amplifier circuit, a first voltage end of the first selector and a control end of the first switch;

a second voltage end of the first selector is in connection with a third output end of the power management circuit, a third voltage end of the first selector is in connection with a first output end of the power management circuit, a first output end of the first selector is connected to a first input end of the operational amplifier circuit, and a second output end of the first selector is connected to a common voltage end of the display panel;

an input end of the first switch is in connection with a second output end of the power management circuit, and an output end of the first switch is connected to a power supply end of the operational amplifier circuit; and an output end of the operational amplifier circuit is connected to a compensation voltage end of the display panel;

wherein the switch circuit is configured, in case that the feedback voltage is greater than or equal to the target threshold, to output the common voltage and the operating voltage to the operational amplifier circuit and stop outputting the common voltage to the display panel, comprises:

in case that the feedback voltage is greater than or equal to the target threshold, the first switch is controlled to switched on via the feedback voltage, a third channel is switched on, and the operating voltage via the first switch is output to the operational amplifier circuit; the first selector is controlled via the feedback voltage to select a first channel to be switched on, and the common voltage via the first selector is output to the operational amplifier circuit; the first selector is controlled via the feedback voltage to select a second channel to be switched off, and the first selector stops outputting the common voltage to the display panel; and wherein the switch circuit is further configured, in case that the feedback voltage is smaller than the target threshold, to output the common voltage to the display panel and stop outputting the common voltage and the operating voltage to the operational amplifier circuit, comprises:

in case that the feedback voltage is smaller than the target threshold, the first switch is controlled to be switched off via the feedback voltage, the third channel is switched off, and the first switch to stop outputting the operating voltage to the operational amplifier circuit; the first selector is controlled via the feedback voltage to select the first channel to be switched off, and the first selector stops outputting the common voltage to the operational amplifier circuit; and the first selector is controlled via the feedback voltage to select the second channel to be switched on, and the common voltage via the first selector is output to the display panel.

16. The display device according to claim 15, wherein the first channel is used to indicate a channel for power supplying of the common voltage between the power management circuit and the operational amplifier circuit; the second channel is used to indicate a channel for power supplying of the common voltage between the power management circuit and the display panel; and the third channel is used to indicate a channel for power supplying of the operating voltage between the power management circuit and the operational amplifier circuit.

* * * * *